(12) United States Patent
Takaoka et al.

(10) Patent No.: US 12,331,770 B2
(45) Date of Patent: Jun. 17, 2025

(54) STRUCTURE UNIT

(71) Applicant: KOBELCO CONSTRUCTION MACHINERY CO., LTD., Hiroshima (JP)

(72) Inventors: Daisuke Takaoka, Hyogo (JP); Yasuo Ichikawa, Hyogo (JP)

(73) Assignee: KOBELCO CONSTRUCTION MACHINERY CO., LTD., Hiroshima (JP)

(*) Notice: Subject to any disclaimer, the term of this patent is extended or adjusted under 35 U.S.C. 154(b) by 647 days.

(21) Appl. No.: 17/636,791

(22) PCT Filed: Aug. 11, 2020

(86) PCT No.: PCT/JP2020/030585
§ 371 (c)(1),
(2) Date: Feb. 18, 2022

(87) PCT Pub. No.: WO2021/044813
PCT Pub. Date: Mar. 11, 2021

(65) Prior Publication Data
US 2022/0290710 A1 Sep. 15, 2022

(30) Foreign Application Priority Data
Sep. 2, 2019 (JP) ................. 2019-159788

(51) Int. Cl.
*F16B 19/02* (2006.01)
*B66C 23/82* (2006.01)

(52) U.S. Cl.
CPC .......... *F16B 19/02* (2013.01); *B66C 23/826* (2013.01); *B66C 2700/0378* (2013.01)

(58) Field of Classification Search
CPC ............ B66C 23/346; B66C 23/826
See application file for complete search history.

(56) References Cited

U.S. PATENT DOCUMENTS

| | | | | |
|---|---|---|---|---|
| 2,975,910 A | * | 3/1961 | Conrad | B66C 23/36 212/300 |
| 7,722,305 B2 | * | 5/2010 | Faith | F16B 19/02 411/351 |

(Continued)

FOREIGN PATENT DOCUMENTS

| | | | |
|---|---|---|---|
| AU | 2019268668 A1 | * 11/2020 | ............ B66C 23/26 |
| JP | 2003-2581 A | 1/2003 | |

(Continued)

OTHER PUBLICATIONS

International Search Report mailed on Oct. 13, 2020 in PCT/JP2020/030585 filed on Aug. 11, 2020, 2 pages.

*Primary Examiner* — Matthew R McMahon
(74) *Attorney, Agent, or Firm* — Oblon, McClelland, Maier & Neustadt, L.L.P.

(57) ABSTRACT

To reduce the number of places where dimension control regarding an attachment position of a coupling portion to a structure is required. A first coupling portion includes a first pin receiving portion into which a coupling pin can be inserted, and a load transmitting portion integrally provided with the first pin receiving portion. A second coupling portion includes a second pin receiving portion into which the coupling pin can be inserted, and a load receiving portion integrally provided with the second pin receiving portion. The first pin receiving portion and the second pin receiving portion match with each other so as to detachably attach the coupling pin in a state where the load transmitting portion and the load receiving portion are in contact with each other.

4 Claims, 10 Drawing Sheets

(56) References Cited

U.S. PATENT DOCUMENTS

| | | | | |
|---|---|---|---|---|
| 7,954,657 B2* | 6/2011 | Holly | ............... | B66C 23/70 |
| | | | | 212/177 |
| 8,944,717 B2* | 2/2015 | Ditzler | ............... | F01M 11/00 |
| | | | | 403/38 |
| 9,132,999 B2* | 9/2015 | Pech | ............... | B66C 23/26 |
| 10,124,774 B2* | 11/2018 | Kitaguchi | ............... | G05G 1/44 |
| 10,704,579 B2* | 7/2020 | Maedo | ............... | B66C 23/344 |
| 2019/0032690 A1* | 1/2019 | Maedo | ............... | F16B 7/0433 |
| 2020/0399099 A1* | 12/2020 | Tanimoto | ............... | B66C 23/74 |

FOREIGN PATENT DOCUMENTS

| | | | | |
|---|---|---|---|---|
| JP | 2012025513 A | * | 2/2012 | |
| JP | 2016222373 A | * | 12/2016 | |
| JP | 2017-24813 A | | 2/2017 | |
| JP | 2017206322 A | * | 11/2017 | |

* cited by examiner

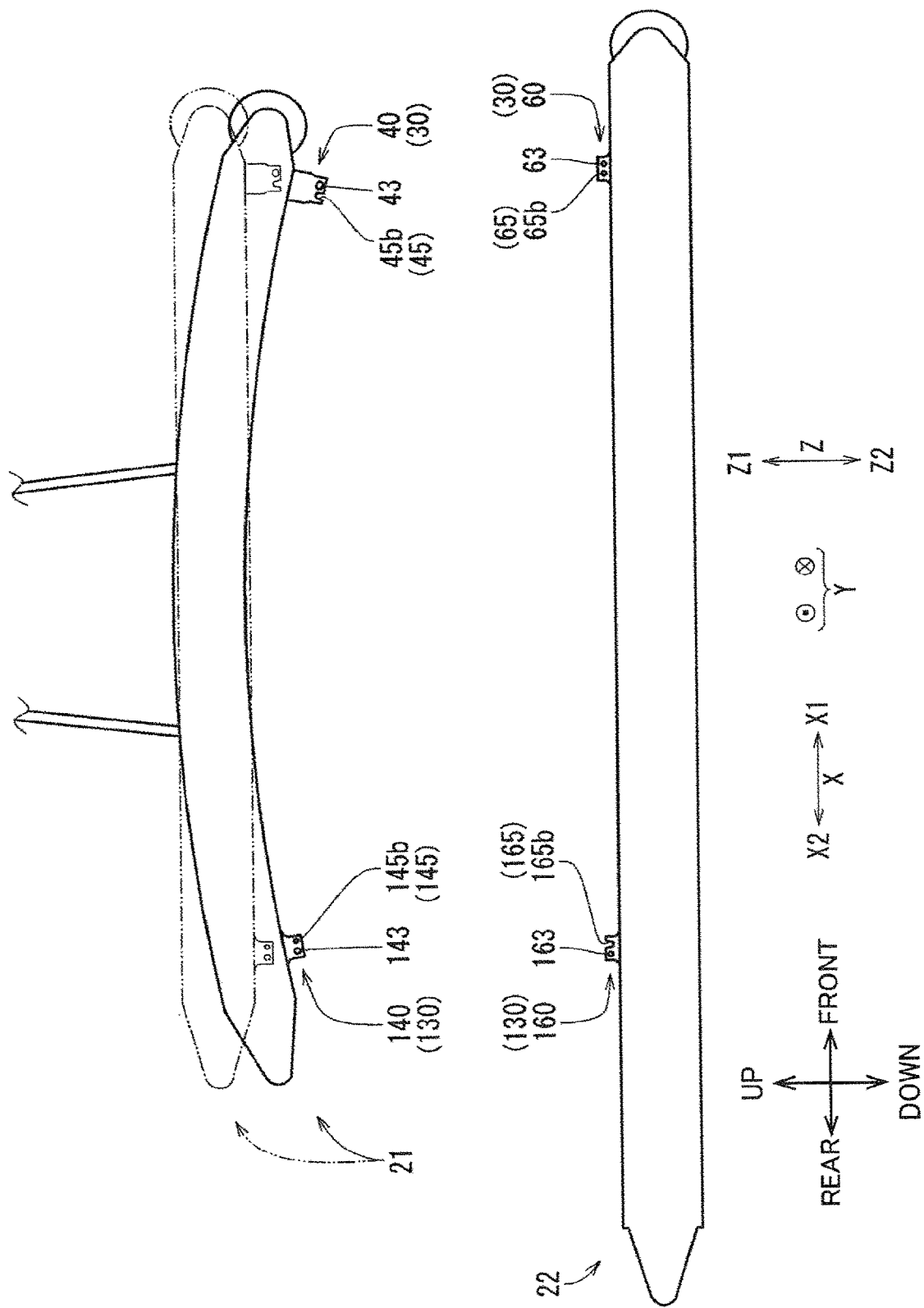

STRUCTURE UNIT

TECHNICAL FIELD

The present invention relates to a structure unit configured by coupling a plurality of structures to each other.

BACKGROUND ART

For example, Patent Literature 1 and the like recite a device that couples structures in a state of being overlaid, the structures having a shape extending in a longitudinal direction. This device has a first bracket (an alignment tool in Patent Literature 1) that is attached to a lower structure and receives a load of an upper structure, and a pair of second brackets (a coupling tool in Patent Literature 1) that are disposed on the upper and lower structures and each have a pin hole into which a connection pin for connecting the structures is inserted. The connection pin is inserted into the second bracket for connecting the structures in a state where the load of the structure is received by the first bracket that receives a load, whereby the structures are coupled to each other.

CITATION LIST

Patent Literature

Patent Literature 1: JP 2017-24813 A

In the above technique, the first bracket (see FIG. 4 of Patent Literature 1) that receives a load of the upper structure and the pair of second brackets (see FIG. 3 of Patent Literature 1) into which the pins are inserted are provided independently of each other. Therefore, it is necessary to control an attachment position of each bracket so that the second bracket is accurately disposed with respect to the first bracket so as to allow pin holes of the pair of second brackets to be aligned with each other. As described above, when there are many places where dimension control is required to be performed regarding the attachment position of each bracket (coupling portion) to the structure, it takes time and effort to attach the bracket to the structure.

SUMMARY OF INVENTION

An object of the present invention is to provide a structure unit allowing reduction of the number of places where dimension control regarding an attachment position of a coupling portion to a structure is required.

According to the present invention, there is provided a structure unit including: a first structure having a shape elongated in a first direction; a second structure having a shape elongated in a second direction; and a structure coupling portion capable of detachably coupling the first structure and the second structure to each other in a coupling allowable state in which the first direction and the second direction extend in horizontal reference directions, respectively, and the first structure is disposed on the second structure. The structure coupling portion includes: a first coupling portion attached to the first structure; a second coupling portion attached to the second structure; and a coupling pin that couples the first coupling portion and the second coupling portion to each other. The first coupling portion includes: a first pin receiving portion provided with a first hole portion capable of receiving the coupling pin along an insertion direction that is a direction intersecting the reference direction; and a load transmitting portion configured to be attachable to the first structure integrally with the first pin receiving portion and to transmit a self-weight of the first structure to the second coupling portion. The second coupling portion includes: a second pin receiving portion provided with a second hole portion capable of receiving the coupling pin inserted into the first hole portion in the coupling allowable state along the insertion direction; a load receiving portion configured to be attachable to the second structure integrally with the second pin receiving portion and to support the load transmitting portion so as to receive the self-weight of the first structure; and a restraining portion that restrains the first coupling portion in the reference direction such that the first hole portion and the second hole portion match with each other in the insertion direction in a state where the load receiving portion supports the load transmitting portion.

BRIEF DESCRIPTION OF DRAWINGS

FIG. 10 is a side view of a state in which the first structure illustrated in FIG. 2 is lifted as viewed from a lateral direction.

DESCRIPTION OF EMBODIMENT

Figure 1:
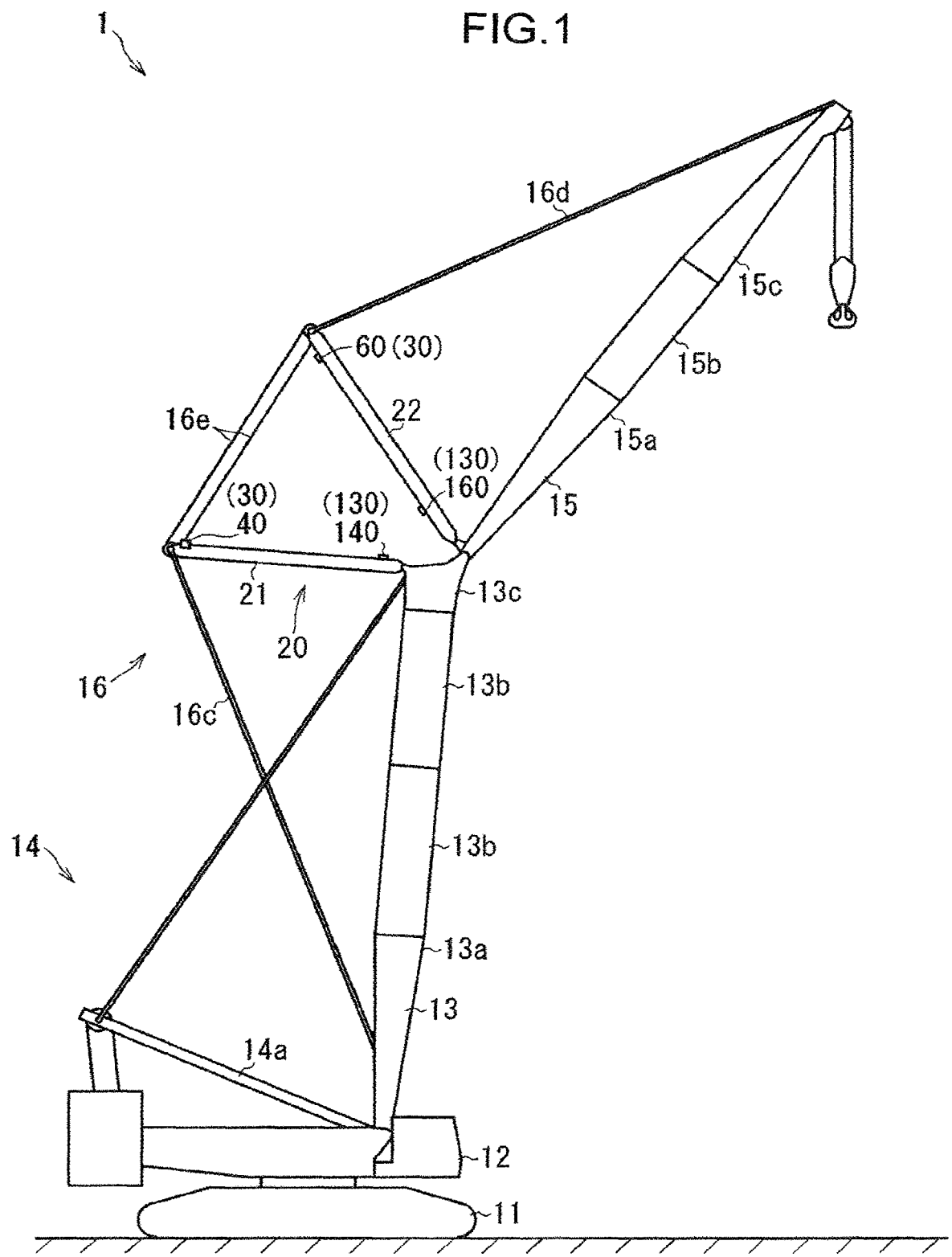
FIG. 1 is a side view of a working machine according to an embodiment of the present invention.

A crane 1 including a structure unit 10 according to the present embodiment will be described with reference to FIG. 1 to FIG. 10. FIG. 1 is a side view of the crane 1 according to an embodiment of the present invention as viewed from the side.

The crane 1 is a working machine that performs work, for example, a construction machine that performs construction work, and is a machine that performs work using, for example, a boom 13. The crane 1 includes a lower travelling body 11, an upper slewing body 12, the boom 13, a boom raising-lowering device 14, a jib 15, a jib raising-lowering device 16, and a structure holding device 20 (structure coupling portion).

The lower travelling body 11 travels on the ground to cause the crane 1 to travel. The lower travelling body 11 may include a crawler or a wheel. The crane 1 may be a crawler crane or a wheel crane. The upper slewing body 12 is mounted on the lower travelling body 11 so as to be turnable around a turning center axis extending in an up-down direction.

The boom 13 is mounted on the upper slewing body 12 so as to be raised and lowered. The boom 13 includes a lower boom 13a, an intermediate boom 13b, and an upper boom 13c. The lower boom 13a is disposed at a proximal end portion (an end portion on the upper slewing body 12 side) of the boom 13. The intermediate boom 13b is coupled to a distal end portion (an end portion on a side opposite to the upper slewing body 12 side) of the lower boom 13a. A plurality of the intermediate booms 13b may be coupled to the lower boom 13a, or only one intermediate boom 13b may be coupled to the lower boom 13a. The upper boom 13c is coupled to a distal end portion of the intermediate boom 13b and is disposed at a distal end portion of the boom 13.

The boom raising-lowering device 14 is a device that raises and lowers the boom 13 with respect to the upper slewing body 12. The boom raising-lowering device 14 includes a mast 14a. The mast 14a is mounted on the upper slewing body 12 so as to be raised and lowered. When the mast 14a is raised and lowered with respect to the upper stewing body 12, the boom 13 is raised and lowered with respect to the upper slewing body 12.

The jib 15 is attached to the boom 13 so as to be raised and lowered. The jib 15 can be disassembled in a longitudinal direction of the jib 15. The jib 15 includes a lower jib 15a, an intermediate jib 15b, and an upper jib 15c. The lower jib 15a is disposed at a proximal end portion (an end portion on the boom 13 side) of the jib 15. The intermediate jib 15b is coupled to a distal end portion (an end portion on a side opposite to the boom 13 side) of the lower jib 15a. The upper jib 15c is coupled to a distal end portion of the intermediate jib 15b and is disposed at a distal end portion of the jib 15.

The jib raising-lowering device 16 is a device that raises and lowers the jib 15 with respect to the boom 13. The jib raising-lowering device 16 includes a rear strut 21 (first structure), a front strut 22 (second structure), a strut guy line 16c, a jib guy line 16d, and a jib raising-lowering rope 16e. The rear strut 21 and the front strut 22 are components of the jib raising-lowering device 16, and are also components of the structure unit 10 together with the structure holding device 20. Details of the rear strut 21 and the front strut 22 will be described later. The strut guy line 16c connects a distal end portion of the rear strut 21 and the boom 13 to each other. The jib guy line 16d connects a distal end portion of the front strut 22 and the distal end portion of the jib 15 to each other. The jib raising-lowering rope 16e is stretched between a sheave 21s provided at the distal end portion of the rear strut 21 and a sheave 22s provided at a distal end portion of the front strut 22. When the jib raising-lowering rope 16e is wound up and unwound by a winch (not illustrated), a distance between the rear strut 21 and the front strut 22 changes, and the front strut 22 is raised and lowered with respect to the boom 13. Since the distal end portion of the front strut 22 and the distal end portion of the jib 15 are connected to each other by the jib guy line 16d, when the front strut 22 is raised and lowered with respect to the boom 13, the jib 15 is raised and lowered with respect to the boom 13.

Figure 2:
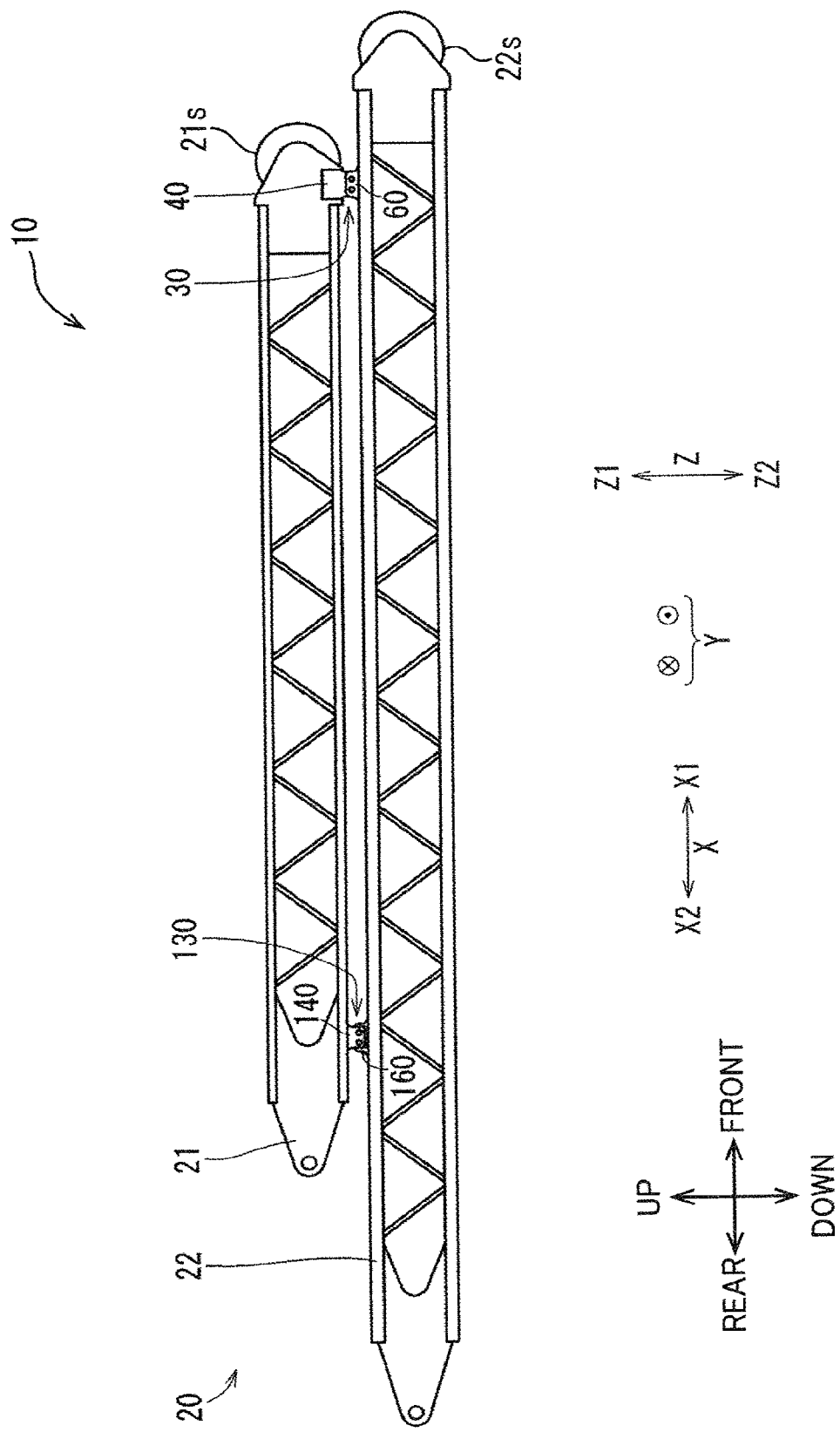
FIG. 2 is a side view of a structure unit including a first structure and a second structure of the working machine illustrated in FIG. 1.
Figure 3:
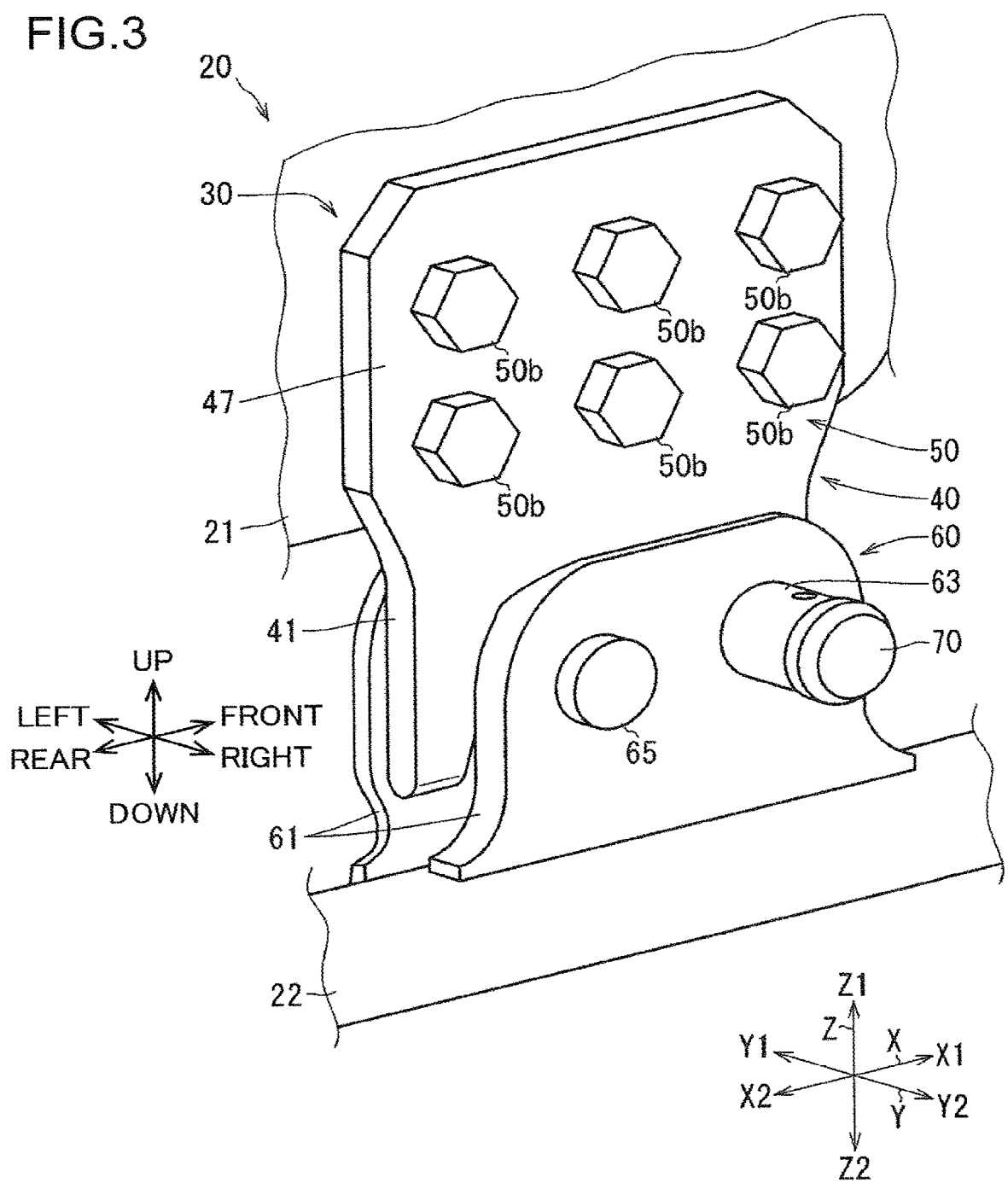
FIG. 3 is a perspective view of a front side device of the structure unit illustrated in FIG. 2.
Figure 4:
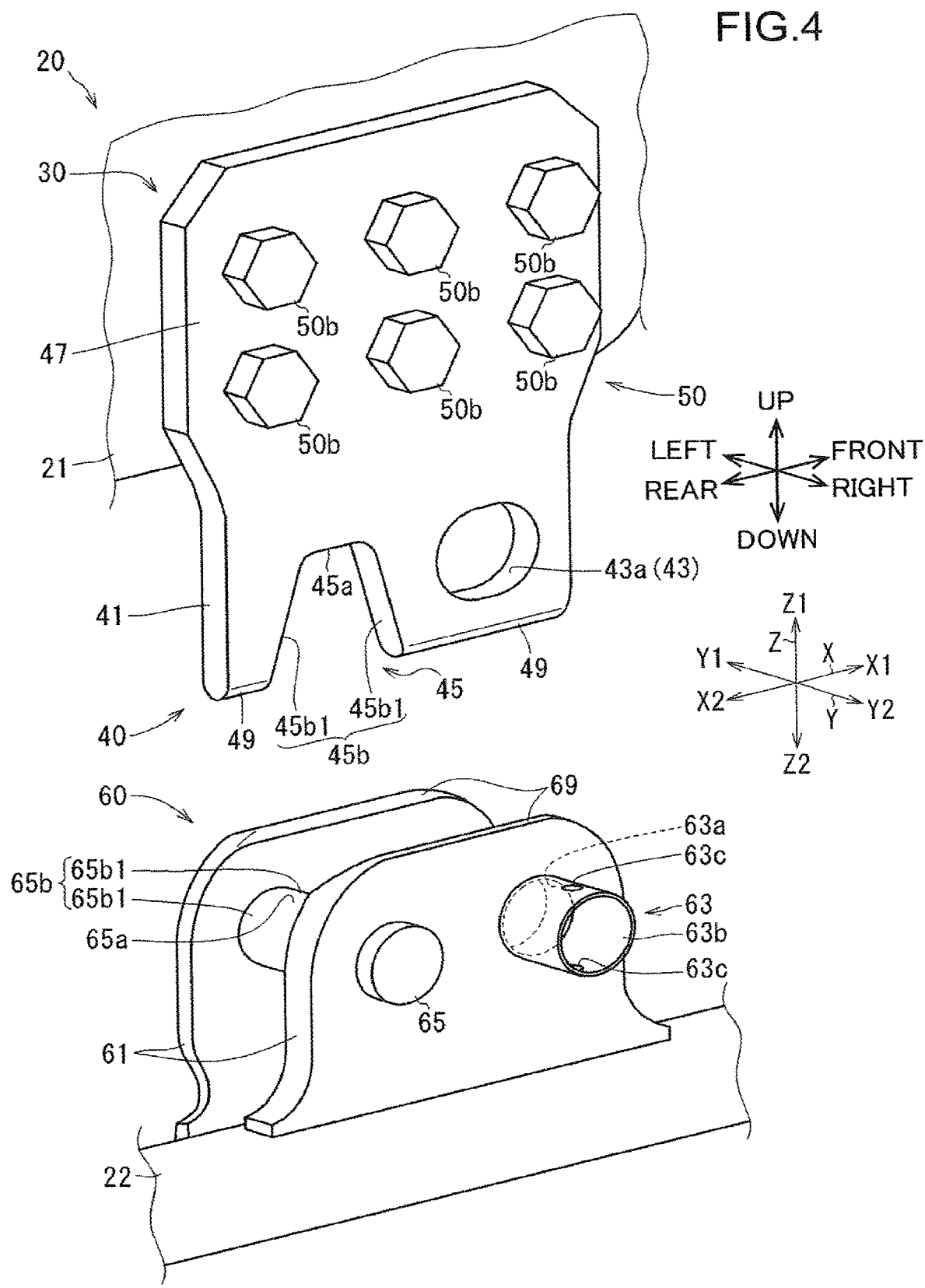
FIG. 4 is a perspective view of the front side device, the view showing a state in which a first coupling portion and a second coupling portion illustrated in FIG. 3 are separated.
Figure 5:
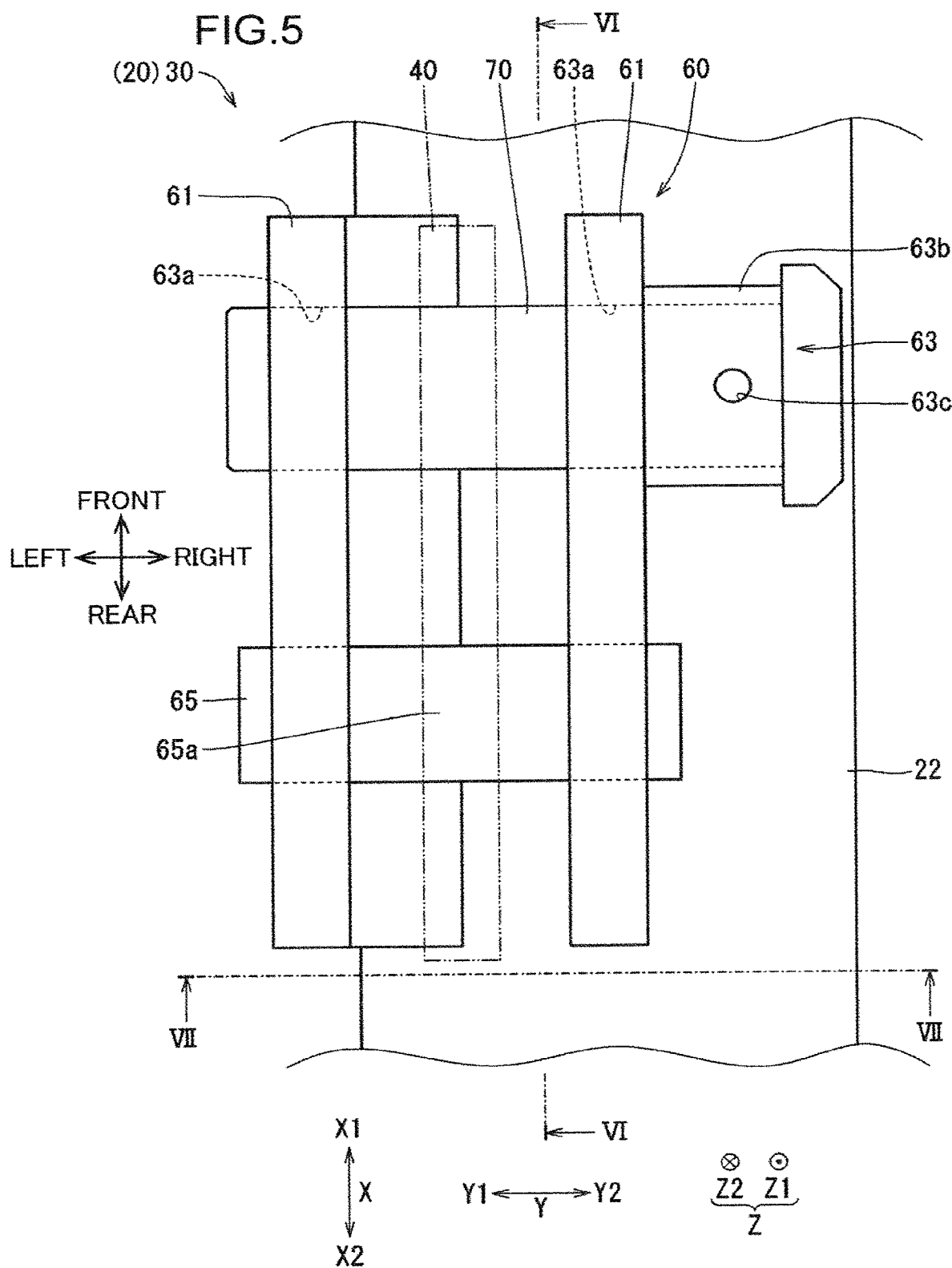
FIG. 5 is a plan view of the second coupling portion illustrated in FIG. 3 as viewed from above.
Figure 6:
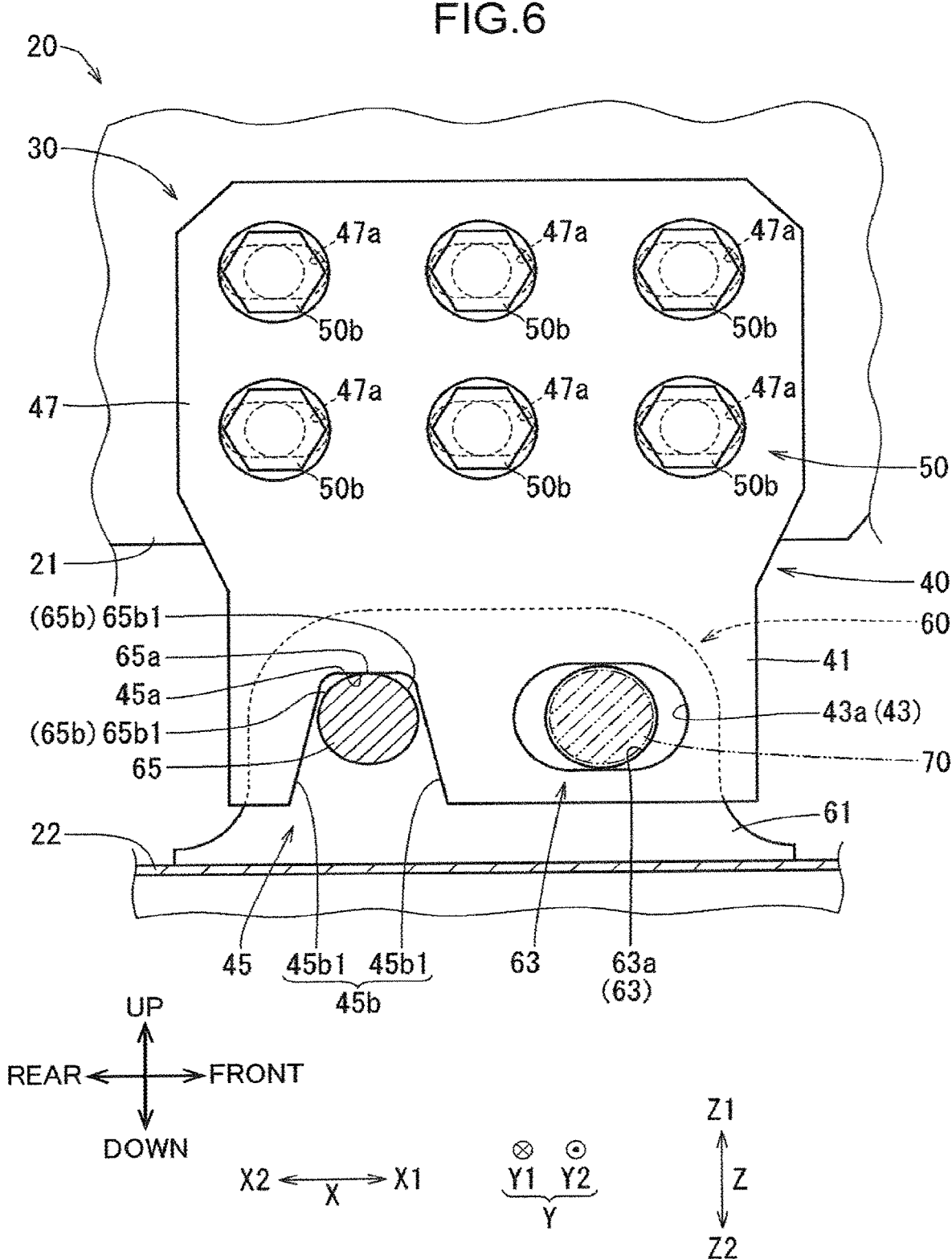
FIG. 6 is a view of the front side device illustrated in FIG. 3 as viewed from a laterally outer side, the view being a cross-sectional view as viewed along arrows VI-VI in FIG. 5.
Figure 7:
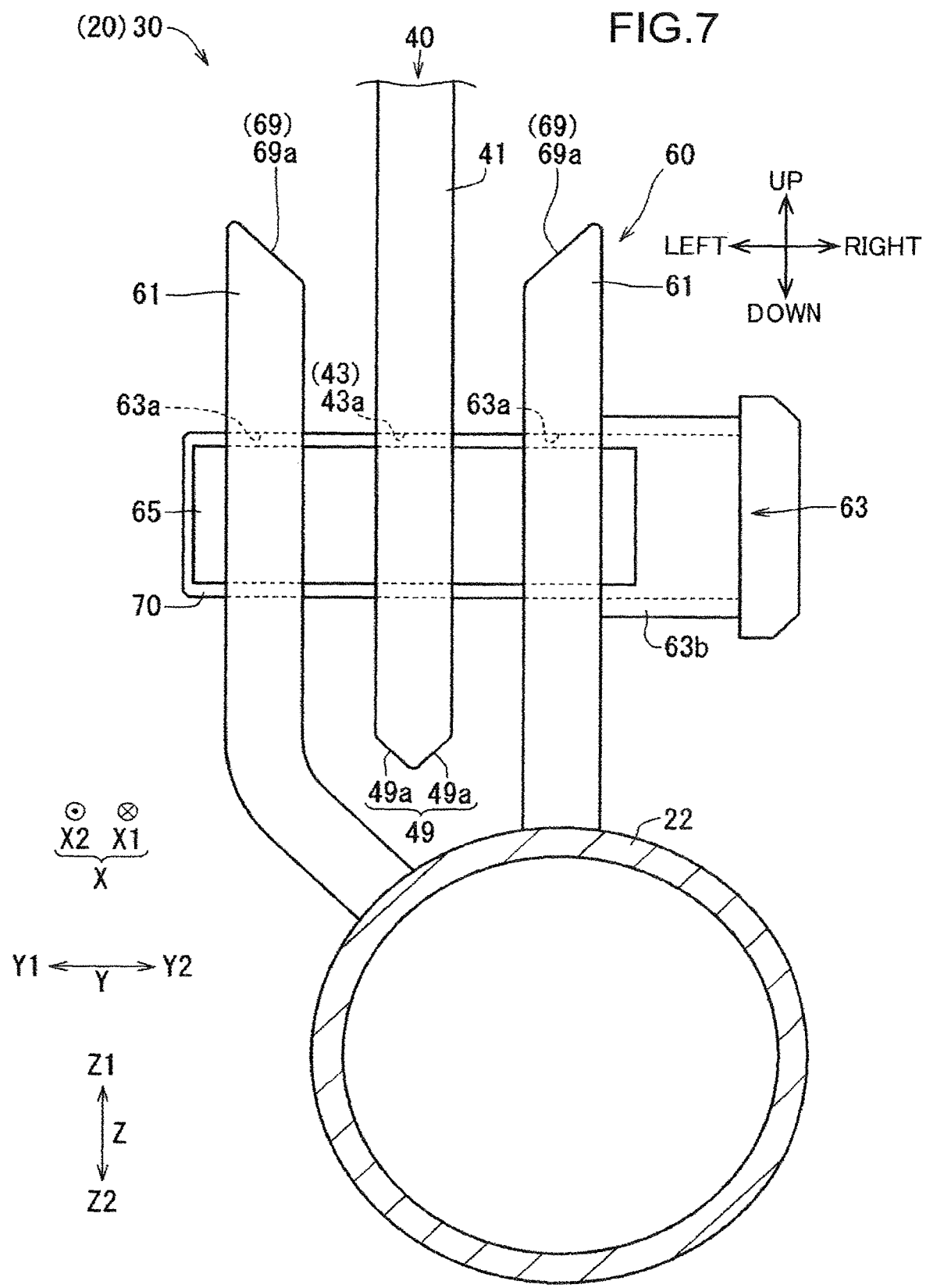
FIG. 7 is a view of the front side device illustrated in FIG. 3 as viewed from the rear, the view being a cross-sectional view as viewed along arrows VII-VII in FIG. 5.

FIG. 2 is a side view of the structure unit 10 including the rear strut 21 and the front strut 22 of the crane 1 illustrated in FIG. 1. FIG. 3 is a perspective view of a front side device 30 of the structure holding device 20 of the structure unit 10 shown in FIG. 2. FIG. 4 is a perspective view of the front side device 30, the view showing a state in which a first bracket 40 and a second bracket 60 illustrated in FIG. 3 are separated from each other. FIG. 5 is a plan view of the second bracket 60 illustrated in FIG. 3 as viewed from above. FIG. 6 is a view of the front side device 30 illustrated in FIG. 3 as viewed from a laterally outer side, and is a cross-sectional view as viewed along arrows VI-VI in FIG. 5. FIG. 7 is a view of the front side device 30 illustrated in FIG. 3 as viewed from the rear, and is a cross-sectional view as viewed along arrows VII-VII in FIG. 5.

As illustrated in FIG. 2, the structure holding device 20 is a device that holds the rear strut 21 with respect to the front strut 22 when the crane 1 is disassembled, in other words, couples the front strut 22 and the rear strut 21 to each other. As described above, the front strut 22, the rear strut 21, and the structure holding device 20 constitute the structure unit 10 (strut unit, raising-lowering member unit) of the present invention. The structure unit 10 can be integrally mounted on a transport vehicle or the like. The structure holding device 20 includes the front side device 30 and a rear side device 130.

The rear strut 21 (first structure) is rotatably attached to the distal end portion of the boom 13 (see FIG. 1). The rear strut 21 is a structure having a shape extending long in a longitudinal direction (first direction). The rear strut 21 may have a lattice structure in which pipes are combined, may include a plate-like member, or may have a box-shaped structure (the same applies to the front strut 22).

The front strut 22 (second structure) may be rotatably attached to the distal end portion of the boom 13, or may be rotatably attached to the proximal end portion of the jib 15. The front strut 22 is a structure having a shape extending long in a longitudinal direction (second direction). As illustrated in FIG. 1, the front strut 22 is disposed between the jib 15 and the rear strut 21 when the crane 1 assumes a workable posture (working posture). When the crane 1 is disassembled and transported, the rear strut 21 and the front strut 22 are transported integrally as illustrated in FIG. 2. Hereinafter, a posture (transport posture) in which the rear strut 21 and the front strut 22 are integrally transported will be mainly described. The rear strut 21 and the front strut 22 are overlaid (stacked, overlapped) in the up-down direction (details of the direction will be described later). The front strut 22 is disposed below the rear strut 21. The front strut 22 is disposed to extend in a longitudinal direction of the rear strut 21, and is disposed to extend parallel or substantially parallel to the rear strut 21. In other words, the state illustrated in FIG. 2 corresponds to a coupling allowable state in which the first direction and the second direction extend in horizontal or substantially horizontal reference directions, and the rear strut 21 is disposed above the front strut 22 at an interval. In this coupling allowable state, the structure holding device 20 can detachably couple the front strut 22 and the rear strut 21 to each other. The rear strut 21, the front strut 22, and the lower jib 15a (see FIG. 1) may be transported integrally. In this case, the front strut 22 is placed on the lower jib 15a, and the rear strut 21 is placed on the front strut 22.

(Direction)

The longitudinal direction (first direction) of the rear strut 21 in the transport posture (coupling allowable state) is defined as a front-rear direction X (reference direction). Since the rear strut 21 and the front strut 22 are parallel or substantially parallel to each other in the transport posture, the longitudinal direction (second direction) of the front strut 22 matches or substantially matches with the front-rear direction X. In the front-rear direction X, a direction from a proximal end portion (a side attached to the boom 13 (see FIG. 1)) of the rear strut 21 toward the distal end portion is defined as a front direction X1, and an opposite direction thereto is defined as a rear direction X2. A direction in which the rear strut 21 and the front strut 22 face each other in the transport posture is defined as an up-down direction Z. In the up-down direction Z, a direction from the front strut 22 toward the rear strut 21 is defined as an upward direction Z1, and an opposite direction thereto is defined as a downward direction Z2. In the transport posture, the up-down direction Z matches with a vertical direction or a substantially vertical direction. A direction orthogonal to each of the front-rear direction X and the up-down direction Z is defined as a lateral direction Y (left-right direction). In the lateral direction Y, a direction approaching a central portion of the rear strut 21 in the lateral direction Y is defined as a laterally inward direction Y1 (see FIG. 3), and a direction separating from the central portion of the rear strut 21 in the lateral direction Y is defined as a laterally outward direction Y2 (see FIG. 3). Each of the above directions is for explaining the crane 1 according to the present embodiment, and does not limit a use mode or the like of the structure unit according to the present invention.

The front side device 30 is disposed on a front portion (more specifically, a more forward side portion than a central portion in the front-rear direction) of each of the rear strut 21 and the front strut 22. The front side device 30 is disposed, for example, near a front end portion of each of the rear strut 21 and the front strut 22. The front side device 30 is disposed on both sides (left and right) of the rear strut 21 and the front strut 22 in the lateral direction (the same applies to the rear side device 130). Hereinafter, the front side device 30 on one side (for example, the right side) in the lateral direction will be described (the same applies to the rear side device 130). As illustrated in FIG. 3, the front side device 30 includes the first bracket 40 (first coupling portion) attached to the rear strut 21, a fastening member 50, the second bracket 60 (second coupling portion) attached to the front strut 22, and a connection pin 70 (coupling pin) that connects (couples) the first bracket 40 and the second bracket 60 to each other.

As illustrated in FIG. 2, the first bracket 40 is provided (attached to) at the rear strut 21, and is provided, for example, at a lower portion of the rear strut 21. As illustrated in FIG. 4, the first bracket 40 is made of, for example, one plate-like portion. The first bracket 40 includes a first plate portion 41, a first retaining portion 43 (first pin receiving portion), a recessed portion 45, a fastening member attaching portion 47, a first front-rear direction guide portion 45b (front-rear direction guide portion, guide portion), and a first lateral direction guide portion 49.

The first plate portion 41 is a plate-like member. The first plate portion 41 is fixed to a front side portion of the rear strut 21 (see FIG. 2). The first plate portion 41 may be fixed to a laterally outer side portion (side surface portion) or may be fixed to a lower portion (bottom portion) of the rear strut 21. Although in the present embodiment, the first plate portion 41 is fixed to the rear strut 21 by the fastening member 50, it may be fixed to the rear strut 21 by welding or the like. The first plate portion 41 protrudes more downward than the lower portion of the rear strut 21. The first plate portion 41 is disposed so as to extend in the up-down direction and the front-rear direction.

The first retaining portion 43 is connected to a second retaining portion 63 via the connection pin 70 (see FIG. 3). A hole portion 43a (pin hole, first hole portion) into which the connection pin 70 can be inserted is formed in the first retaining portion 43. The hole portion 43a is a hole (more specifically, an inner surface of the hole) formed in the first plate portion 41. The hole portion 43a penetrates the first plate portion 41 in a direction (e.g., the lateral direction) orthogonal to the up-down direction. In other words, the hole portion 43a can receive the connection pin 70 along an insertion direction that is a direction intersecting the front-rear direction. The hole portion 43a is disposed further below a lower surface of the rear strut 21. The hole portion 43a is a long hole extending long in the front-rear direction. As a result, even when a center position of a hole portion 63a (to be described later) of the second retaining portion 63 is shifted in the front-rear direction from a center position of the hole portion 43a (a center of the hole portion 43a in the drawing as viewed from the lateral direction), the connection pill 70 (see FIG. 3) can be inserted into the hole portion 43a and the hole portion 63a.

The recessed portion 45 is a portion into which a load receiving member 65 to be described later is inserted (enters). The recessed portion 45 has a shape recessed upward from a lower end portion of the first plate portion 41. The recessed portion 45 has, for example, a U shape, a substantially U shape, a V shape, or a substantially V shape when viewed from the lateral direction. The recessed portion 45 includes a first load receiving portion 45a (load transmitting portion) and a first front-rear direction guide portion 45b (guide portion).

The first load receiving portion 45a receives a load (load due to mass) of the rear strut 21 upon contact with a second load receiving portion 65a (to be described later). In other words, the first load receiving portion 45a transmits a self-weight of the rear strut 21 to the second bracket 60. When the first load receiving portion 45a and the second load receiving portion 65a receive the load of the rear strut 21, the load of the rear strut 21 does not act on the connection pin 70 (see FIG. 3), and the connection pin 70 can be attached to and detached from the hole portion 43a and the hole portion 63a. The first load receiving portion 45a and the first retaining portion 43 are integrally provided. Specifically, the first load receiving portion 45a (the recessed portion 45) can be attached to the rear strut 21 integrally with the first retaining portion 43. The first bracket 40 is a bracket (integrated bracket) in which the first load receiving portion 45a and the first retaining portion 43 are integrated. The first load receiving portion 45a and the first retaining portion 43 are provided in the common first bracket 40 and are provided in the common first plate portion 41. Integral provision with the first retaining portion 43 is also applied to the first front-rear direction guide portion 45b, the fastening member attaching portion 47, and the first lateral direction guide portion 49. Although the first load receiving portion 45a is preferably disposed on a more rearward side than the first retaining portion 43 as will be described later, it may be disposed on a more forward side than the first retaining portion 43. The first load receiving portion 45a is disposed more downward than the lower surface (lower surface portion) of the rear strut 21. The first load receiving portion 45a is disposed in an upper portion (upper surface portion) of the recessed portion 45. The first load receiving portion 45a is a surface facing downward and is a surface (e.g., a flat surface) disposed to extend in the front-rear direction and the lateral direction.

The first front-rear direction guide portion 45b (guide portion, front-rear direction guide portion) guides the position of the load receiving member 65 (the second load receiving portion 65a) in the front-rear direction with respect to the recessed portion 45 (the first load receiving portion 45a) upon contact with a part of the second bracket 60. The first front-rear direction guide portion 45b guides the load receiving member 65 in a direction in which a deviation of the position in the front-rear direction of the second retaining portion 63 with respect to the first retaining portion 43 is reduced. The first front-rear direction guide portion 45*b* is disposed in each of a front portion and a rear portion of the recessed portion 45. The first front-rear direction guide portion 45*b* is disposed a more forward side and a more rearward side than the first load receiving portion 45*a*. The first front-rear direction guide portion 45*b* has two inclined portions 45*b*1. The distance between the two inclined portions 45*b*1 in the front-rear direction becomes narrower toward the upper side. More specifically, as illustrated in FIG. 6, the inclined portion 45*b*1 on the front side is inclined in the up-down direction so as to be disposed more rearward side as going upward. Although the inclined portion 45*b*1 on the front side extends, for example, linearly when viewed from the lateral direction, it may extend in a curved shape (the same applies to the inclined portion 45*b*1 on the rear side). The inclined portion 45*b*1 on the rear side is inclined in the up-down direction so as to be disposed more forward as going upward. Note that the first front-rear direction guide portion 45*b* may be provided only on one of a more forward side and a more rearward side than the first load receiving portion 45*a*.

As illustrated in FIG. 4, the fastening member attaching portion 47 is a portion to which the fastening member 50 is attached. The fastening member attaching portion 47 is provided on the first plate portion 41 and is disposed in a portion of the first plate portion 41 facing the rear strut 21 in the lateral direction. For example, as illustrated in FIG. 6, in a case where the fastening member 50 is a bolt 50*b* (to be described later), a hole 47*a* into which the bolt 50*b* can be inserted is formed in the fastening member attaching portion 47. The hole 47*a* penetrates the first plate portion 41 in the lateral direction. The hole 47*a* is a long hole having a shape extending long in the front-rear direction.

As illustrated in FIG. 4, the first lateral direction guide portion 49 guides the position (lateral direction position) of the first bracket 40 in the lateral direction with respect to the second bracket 60. The first lateral direction guide portion 49 is configured as follows. When a lower end portion of the first bracket 40 approaches and comes into contact with an upper end portion of the second bracket 60, the first lateral direction guide portion 49 guides so that the first plate portion 41 is inserted between the two second plate portions 61. The first lateral direction guide portion 49 is disposed at the lower end portion (of the first plate portion 41) of the first bracket 40. For example, as illustrated in FIG. 7, the first lateral direction guide portion 49 has a U shape, a substantially U shape, a V shape, a substantially V shape, or the like when viewed from the front-rear direction. Specifically, for example, the first lateral direction guide portion 49 has two inclined portions 49*a*. The distance between the two inclined portions 49*a* in the left-right direction becomes narrower toward the lower side. The inclined portion 49*a* may extend linearly or may extend in a curved shape when viewed from the front-rear direction.

As illustrated in FIG. 6, the fastening member 50 fastens the first bracket 40 to the rear strut 21 so as to be position-adjustable in the front-rear direction. The fastening member 50 includes, for example, a plurality of (six in the example illustrated in FIG. 6) the bolts 50*b*. In a state where the fastening by the fastening member 50 is loosened, the first bracket 40 is movable in the front-rear direction with respect to the rear strut 21. Since the hole 47*a* of the fastening member attaching portion 47 is a long hole, the first bracket 40 is movable in the front-rear direction with respect to the rear strut 21 (the position is adjustable) in a state where the fastening by the fastening member 50 is loosened. As a result, the position of the first bracket 40 with respect to the rear strut 21 is adjusted so that the connection pin 70 can be inserted into the hole portion 43*a* of the first retaining portion 43 and the hole portion 63*a* of the second retaining portion 63. In a state where the fastening member 50 illustrated in FIG. 4 is fastened, the first bracket 40 is fixed to the rear strut 21.

As illustrated in FIG. 2, the second bracket 60 is provided on (attached to) the front strut 22, and is provided, for example, in an upper portion of the front strut 22. As illustrated in FIG. 4, the second bracket 60 includes, for example, two plate-like portions. The second bracket 60 includes the two second plate portions 61, the second retaining portion 63 (second pin receiving portion), the load receiving member 65, and a second lateral direction guide portion 69.

The two second plate portions 61 are plate-shaped members. The two second plate portions 61 (female plates) are disposed at an interval from each other in the lateral direction such that one first bracket 40 (first plate portion 41) (male plate) can be disposed between the two second plate portions 61 (see FIG. 3). The second plate portion 61 may be fixed to the upper portion (specifically, e.g., a pipe or the like) of the front strut 22, or may be fixed to a laterally outer portion (side surface portion) of the front strut 22. The second plate portion 61 protrudes more upward than an upper surface of the front strut 22. The second plate portion 61 is disposed so as to extend in the up-down direction and the front-rear direction. The second plate portion 61 may be fixed to the front strut 22 by welding, or may be fixed to the front strut 22 by a member similar to the fastening member 50.

The second retaining portion 63 is connected to the first retaining portion 43 via the connection pin 70 (see FIG. 3). The second retaining portion 63 has a cylindrical portion 63*b*, and the hole portion 63*a* (second hole portion, pin hole) is formed in the second retaining portion 63. The hole portion 63*a* is a hole (more specifically, an inner surface of the hole) into which the connection pin 70 (see FIG. 3) can be inserted. As illustrated in FIG. 5, the hole portion 63*a* is provided in each of the two second plate portions 61. As illustrated in FIG. 4, the hole portion 63*a* penetrates the second plate portion 61 in a direction (e.g., the lateral direction) orthogonal to the up-down direction. The hole portion 63*a* has, for example, a circular shape when viewed from the lateral direction. The hole portion 63*a* may be a long hole (see the hole portion 43*a*) having a shape extending long in the front-rear direction. The hole portion 63*a* is disposed above the upper surface (the upper surface portion) of the front strut 22. The pair of hole portions 63*a* formed in each of the second plate portions 61 is configured to be capable of receiving the connection pin 70 inserted into the hole portion 43*a* (first hole portion) in the transport posture (coupling allowable state) along the insertion direction (lateral direction).

The cylindrical portion 63*b* is a cylindrical part into which the connection pin 70 (see FIG. 3) can be inserted. The inside of the cylindrical portion 63*b* communicates with the inside of the hole portion 63*a* in the lateral direction. The cylindrical portion 63*b* protrudes outward in the lateral direction from the second plate portion 61 on the laterally outer side. A pair of attachment pin holes 63*c* is formed in the cylindrical portion 63*b*. The pair of attachment pin holes 63*c* is a hole into which an attachment pin (not illustrated) for preventing the connection pin 70 from coming off from the second bracket 60 is inserted. The paired attachment pin holes 63c are formed in the cylindrical portion 63b so as to face each other in a radial direction of the cylindrical portion 63b, and penetrate the cylindrical portion 63b in the radial direction of the cylindrical portion 63b. When the attachment pin is inserted into the pair of attachment pin holes 63c, a part of the attachment pin is disposed inside the cylinder of the cylindrical portion 63b, so that the connection pin 70 is prevented from coming off.

The load receiving member 65 is a member to be inserted into (enter, engaged with) the recessed portion 45. As illustrated in FIG. 5, the load receiving member 65 is fixed to the two second plate portions 61, and is fixed (permanently installed) by welding, for example. The load receiving member 65 is disposed so as to connect the two second plate portions 61 to each other and is disposed so as to extend in the lateral direction. The load receiving member 65 is disposed above the upper surface of the front strut 22. The load receiving member 65 has a columnar shape, and may have, for example, a cylindrical shape (pin) or a polygonal columnar shape (quadrangular prism shape or the like). The load receiving member 65 includes the second load receiving portion 65a (load receiving portion) and a second front-rear direction guide portion 65b (front-rear direction guide portion).

As illustrated in FIG. 6, the second load receiving portion 65a receives the load (self-weight) of the rear strut 21 upon contact with the first load receiving portion 45a. The second load receiving portion 65a supports the first load receiving portion 45a from below. As illustrated in FIG. 4, the second load receiving portion 65a and the second retaining portion 63 are integrally provided. In other words, the second load receiving portion 65a (the load receiving member 65) can be attached to the front strut 22 integrally with the second retaining portion 63. The second bracket 60 is a bracket (integrated bracket) in which the second load receiving portion 65a and the second retaining portion 63 are integrated. The second load receiving portion 65a and the second retaining portion 63 are provided in the common second bracket 60. Integral provision with the second retaining portion 63 is also applied to the second front-rear direction guide portion 65b and the second lateral direction guide portion 69. Although the second load receiving portion 65a is preferably disposed a more rearward side than the second retaining portion 63 as will be described later, it may be disposed a more forward side than the second retaining portion 63. The second load receiving portion 65a is disposed above the upper surface (upper surface portion) of the front strut 22. The second load receiving portion 65a is disposed in an upper portion of the load receiving member 65. In a case of the load receiving member 65 having a columnar shape, the second load receiving portion 65a is an upper end portion (upper end portion, top portion) of an outer peripheral surface of the load receiving member 65. The second load receiving portion 65a may be a flat surface facing upward or the like.

The second front-rear direction guide portion 65b (front-rear direction guide portion) guides a position of the recessed portion 45 in the front-rear direction with respect to the load receiving member 65 upon contact with a part of the first bracket 40. The second front-rear direction guide portion 65b guides the recessed portion 45 in a direction in which a deviation of the position in the front-rear direction of the second retaining portion 63 with respect to the first retaining portion 43 is reduced. The second front-rear direction guide portion 65b is disposed in each of a front portion and a rear portion of the upper portion of the load receiving member 65. The second front-rear direction guide portion 65b is disposed on a more forward side and a more rearward side than the second load receiving portion 65a. Specifically, for example, as illustrated in FIG. 6, the second front-rear direction guide portion 65b includes two inclined portions 65b1. A width between the two inclined portions 65b1 in the front-rear direction becomes narrower toward the upper side. More specifically, the inclined portion 65b1 on the front side is inclined in the up-down direction so as to be disposed more rearward as going upward. The inclined portion 45b1 on the front side extends in a curved shape (in the example illustrated in FIG. 6, an arc shape, the outer peripheral surface of the load receiving member 65) and may extend linearly when viewed from the lateral direction (the same applies to the inclined portion 65b1 on the rear side). The inclined portion 65b1 on the rear side is inclined in the up-down direction so as to be disposed more forward as going upward. The pair of inclined portions 65b1 also functions as a restraining portion of the present invention. Specifically, the pair of inclined portions 65b1 restrains the first bracket 40 in the front-rear direction (reference direction) such that the hole portion 43a and the hole portion 63a match with each other in the insertion direction (lateral direction) in a state where the second load receiving portion 65a supports the first load receiving portion 45a. At this time, an upper portion of the pair of inclined portions 45b1 (FIG. 4) functions as a restrained portion of the present invention. In other words, the upper portions of the pair of inclined portions 45b1 are restrained in the front-rear direction (reference direction) by the pair of inclined portions 65b1. As a result, as described above, the hole portion 43a and the hole portion 63a match with each other in the insertion direction (lateral direction). Further, lower portions of the pair of inclined portions 45b1 and the pair of inclined portions 65b1 function as a guide portion of the present invention. Specifically, the lower portions of the pair of inclined portions 45b1 and the pair of inclined portions 65b1 guide the first load receiving portion 45a toward the second load receiving portion 65a along the downward direction and the front-rear direction. Only one of the first front-rear direction guide portion 45b and the second front-rear direction guide portion 65b may include the inclined portion (the inclined portion 45b1 or the inclined portion 65b1).

As illustrated in FIG. 7, the second lateral direction guide portion 69 guides a position (lateral direction position) of the first bracket 40 in the lateral direction with respect to the second bracket 60. The second lateral direction guide portion 69 is configured as follows. When the lower end portion of the first bracket 40 approaches and comes into contact with the upper end portion of the second bracket 60, the second lateral direction guide portion 69 guides the first plate portion 41 to be inserted between the two second plate portions 61. The second lateral direction guide portion 69 is disposed at the upper end portion of the second bracket 60, and is provided at an upper end portion of each of the two second plate portions 61. Specifically, for example, the second lateral direction guide portion 69 includes two inclined portions 69a. A distance between the two inclined portions 69a in the lateral direction becomes narrower toward the lower side. More specifically, the inclined portion 69a on the laterally outer side (right side) is inclined in the up-down direction so as to be disposed on the laterally inner side (left side) as going downward. The inclined portion 69a on the laterally inner side (left side) is inclined in the up-down direction so as to be disposed on the laterally outer side (right side) as going downward. The inclined portion 69a may extend linearly or may extend in a curved shape when viewed from the front-rear direction. Only one of the first lateral direction guide portion 49 and the second bracket 60 may include the inclined portion (the inclined portion 49a or the inclined portion 69a).

The connection pin 70 connects the front strut 22 and the rear strut 21 (see FIG. 2) to each other by connecting the first bracket 40 and the second bracket 60. The connection pin 70 is inserted into the hole portion 43a of the first retaining portion 43 and the hole portion 63a and the cylindrical portion 63b of the second retaining portion 63. The first bracket 40 and the second bracket 60 are configured such that the connection pin 70 can be inserted in this manner. More specifically, as illustrated in FIG. 6, the first retaining portion 43 and the second retaining portion 63 are disposed at positions where the connection pin 70 is attachable and detachable (insertable, pullable) to/from the first retaining portion 43 and the second retaining portion 63 in a state where the first load receiving portion 45a and the second load receiving portion 65a are in contact with each other. At this time, the position of the hole portion 43a of the first retaining portion 43 and the position of the hole portion 63a of the second retaining portion 63 match with each other. At this time, the center position (the center of the drawing as viewed from the lateral direction) of the hole portion 43a of the first retaining portion 43 and the center position of the hole portion 63a of the second retaining portion 63 match with each other (the cores match with each other) or substantially match with each other. In a case where the hole portion 43a is a long hole, the entire region inside the hole portion 63a viewed from the lateral direction is included in a region inside the hole portion 43a as viewed from the lateral direction.

Figure 8:
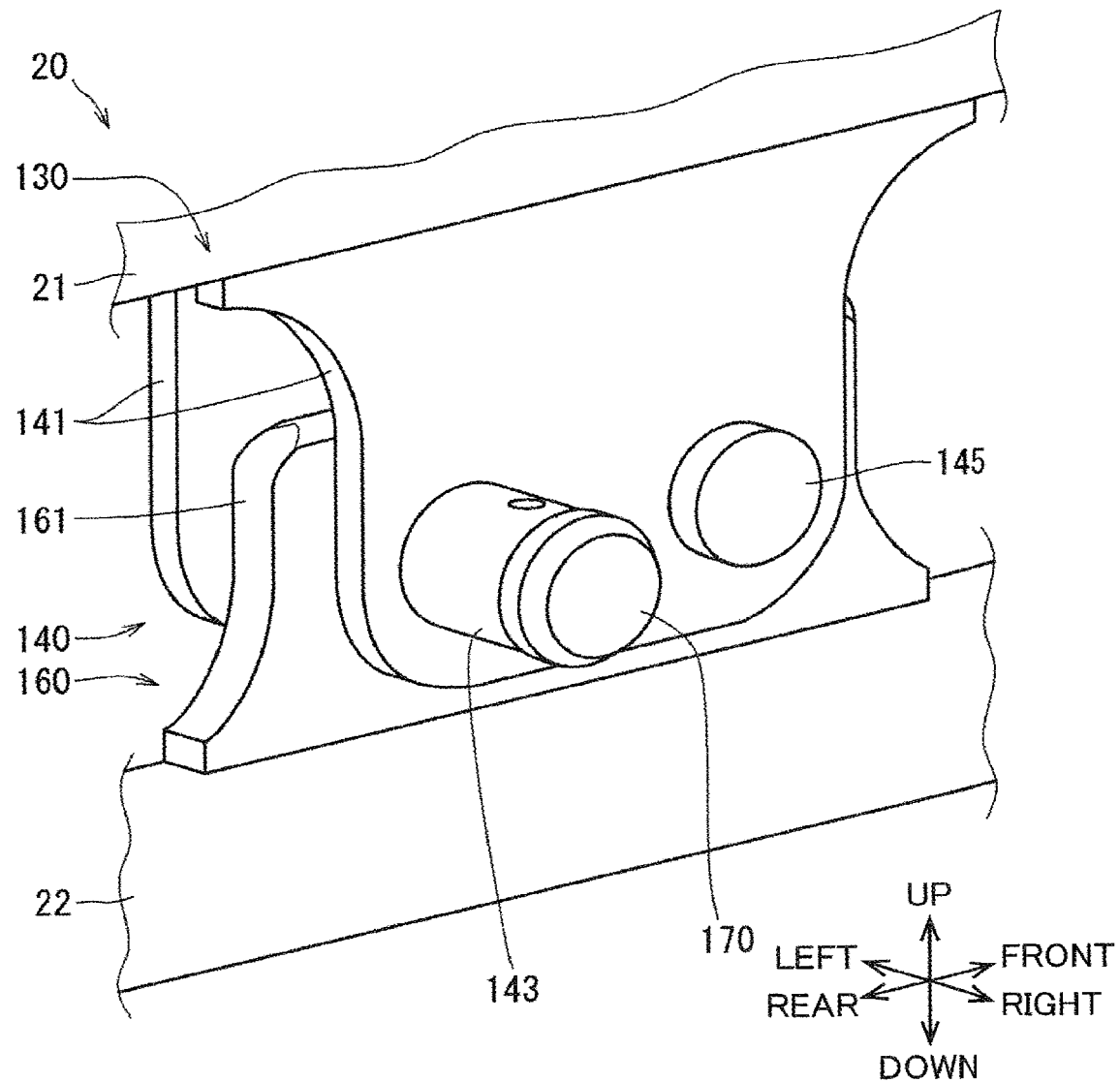
FIG. 8 is a perspective view of a rear side device illustrated in FIG. 2.
Figure 9:
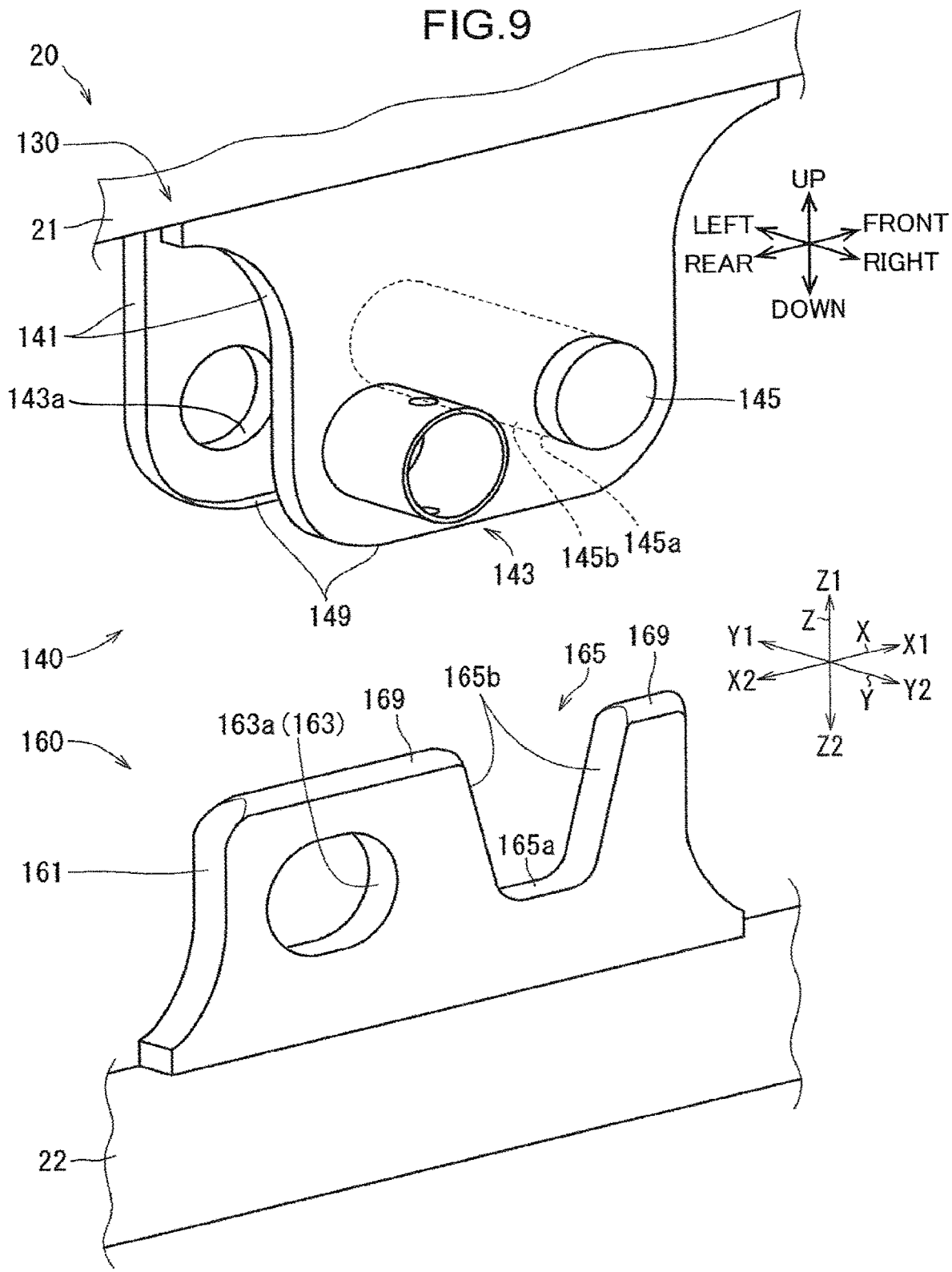
FIG. 9 is a perspective view of a rear side device, the view showing a state in which the first coupling portion and the second coupling portion illustrated in FIG. 8 are separated from each other.

FIG. 8 is a perspective view of the rear side device 130 illustrated in FIG. 2. FIG. 9 is a perspective view of the rear side device 130 showing a state in which the first bracket 140 and the second bracket 160 illustrated in FIG. 8 are separated from each other.

As shown in FIG. 2, the rear side device 130 is disposed more rearward than the front side device 30, and is disposed on a rear side portion of the rear strut 21 and the front strut 22 (a portion more rearward than a central portion in the front-rear direction). The rear side device 130 is disposed, for example, near an end portion on the rear side of the rear strut 21, and is disposed in a part between the central portion and the rear side end portion of the front strut 22 in the front-rear direction. In the example shown in FIG. 8 and FIG. 9, the rear side device 130 is provided to be substantially opposite to the front side device 30 (see FIG. 3 and FIG. 4) in the up-down direction and is provided to be substantially opposite to the front side device in the front-rear direction (provided to be reversed in the up-down direction and the front-rear direction). As illustrated in FIG. 9, the rear side device 130 includes the first bracket 140 (first coupling portion), the second bracket 160 (second coupling portion), and a connection pin 170 (coupling pin).

The first bracket 140 has a configuration obtained by reversing the second bracket 60 of the front side device 30 illustrated in FIG. 4 in the up-down direction and the front-rear direction. Specifically, for example, as illustrated in FIG. 9, the first bracket 140 includes two first plate portions 141, a first retaining portion 143 (first pin receiving portion) similar to the second retaining portion 63 (see FIG. 4), and a load receiving member 145 similar to the load receiving member 65 (see FIG. 4). The load receiving member 145 includes a first load receiving portion 145a (load transmitting portion) and a first front-rear direction guide portion 145b (restrained portion) similar to the load receiving member 65 (see FIG. 4) (whose structure is, however, reverse in the up-down direction). The first retaining portion 143 is provided with a pair of hole portions 143a (first hole portion, pin hole) penetrating the two first plate portions 141, respectively. The first bracket 140 includes a first lateral direction guide portion 149 similar to the second lateral direction guide portion 69 (see FIG. 4) (whose structure is, however, reverse in the up-down direction).

The second bracket 160 has a configuration obtained by reversing the first bracket 40 of the front side device 30 illustrated in FIG. 4 in the up-down direction and the front-rear direction. Specifically, for example, as illustrated in FIG. 9, the second bracket 160 includes one second plate portion 161, a second retaining portion 163 (second pin receiving portion) similar to the first retaining portion 43 (see FIG. 4), and a recessed portion 165 similar to the recessed portion 45 (see FIG. 4) (whose structure is, however, reverse in the up-down direction). The second retaining portion 163 is provided with a hole portion 163a (second hole portion, pin hole). The recessed portion 165 has a second load receiving portion 165a (load receiving portion) and a second front-rear direction guide portion 165b (guide portion) similar to the recessed portion 45 (see FIG. 4) (whose structure is, however, reverse in the up-down direction). The second bracket 160 includes a second lateral direction guide portion 169 similar to the first lateral direction guide portion 49 (whose structure is, however, reverse in the up-down direction).

Similarly to the connection pin 70 illustrated in FIG. 3, the connection pin 170 connects (couples) the first bracket 140 and the second bracket 160 illustrated in FIG. 8 to each other. The connection pin 170 is inserted into the hole portion 143a of the first retaining portion 143 and the hole portion 163a (see FIG. 9) of the second retaining portion 163.

The hole portion 143a is allowed to receive the connection pin 170 along an insertion direction that is a direction (lateral direction) intersecting the front-rear direction, and the hole portion 163a is allowed to receive the connection pin 170 inserted into the hole portion 143a in the coupling allowable state along the insertion direction. The first load receiving portion 145a is attachable to the rear strut 21 integrally with the first retaining portion 143, and transmits the self-weight of the rear strut 21 to the second bracket 160. The second load receiving portion 165a is attachable to the front strut 22 integrally with the second retaining portion 163, and supports the first load receiving portion 145a so as to receive the self-weight of the rear strut 21. A lower portion (restraining portion) of a pair of inclined portions of the second front-rear direction guide portion 165b in FIG. 9 restrains the first front-rear direction guide portion 145b (restrained portion) of the first bracket 140 in the front-rear direction (reference direction) such that the hole portion 143a and the hole portion 163a match with each other in the insertion direction in a state where the second load receiving portion 165a supports the first load receiving portion 145a. An upper portion (guide portion) of the pair of inclined portions of the second front-rear direction guide portion 165b guides the first load receiving portion 145a downward and along the front-rear direction toward the second load receiving portion 165a.

(Operation)

The crane 1 illustrated in FIG. 1 is configured to operate as follows.

(Connection Between Rear Strut 21 and Front Strut 22)

Connection (coupling) between the rear strut 21 and the front strut 22 illustrated in FIG. 2 is performed as follows.

In the following, description will be made according to a procedure of the work. The procedure of the work may be changed.

The front strut 22 is disposed on the ground or a transportation vehicle such that the longitudinal direction (second direction) of the front strut 22 corresponds to a horizontal direction or a substantially horizontal direction. The rear strut 21 is lowered so as to approach the upper surface of the front strut 22 in a state of being lifted by, for example, an auxiliary crane (a machine for assembling and disassembling the crane 1). Then, the first bracket 40 and the second bracket 60 of the front side device 30 are brought close to each other, and the first bracket 140 and the second bracket 160 of the rear side device 130 are brought close to each other. The front side device 30 will be further described below.

As illustrated in FIG. 4, when the first bracket 40 and the second bracket 60 are brought close to each other, the lower end portion of the first plate portion 41 and the upper end portion of the second plate portion 61 may come into contact with each other. At this time, the inclined portion 49*a* (see FIG. 7) of the first lateral direction guide portion 49 and the inclined portion 69*a* of the second lateral direction guide portion 69 come into contact with each other. In this state, when the rear strut 21 is further lowered, the first plate portion 41 is laterally guided by each lateral direction guide portion such that the first plate portion 41 is inserted between the two second plate portions 61.

When the recessed portion 45 and the load receiving member 65 are brought close to each other, a lower end portion (inlet portion) of the recessed portion 45 and the upper portion of the load receiving member 65 may come into contact with each other. At this time, the lower end portion on the rear side of the recessed portion 45 and the inclined portion 65*b*1 on the rear side of the second front-rear direction guide portion 65*b* come into contact with each other, or the lower end portion on the front side of the recessed portion 45 and the inclined portion 65*b*1 on the front side of the second front-rear direction guide portion 65*b* come into contact with each other. In this state, when the rear strut 21 is further lowered, the recessed portion 45 is guided in the front-rear direction by each front-rear direction guide portion so that the load receiving member 65 is inserted into the recessed portion 45.

When the recessed portion 45 and the load receiving member 65 are brought close to each other, the inclined portion 45*b*1 of the first front-rear direction guide portion 45*b* of the recessed portion 45 and the load receiving member 65 may come into contact with each other. When the rear strut 21 is lowered in this state, the recessed portion 45 is guided in the front-rear direction by the first front-rear direction guide portion 45*b* so that a deviation of the second load receiving portion 65*a* in the front-rear direction with respect to the first load receiving portion 45*a* is reduced.

When the rear strut 21 is lowered, the first load receiving portion 45*a* comes into contact with the second load receiving portion 65*a*. Then, the load (self-weight) of the rear strut 21 is received by the load receiving member 65. At this time, the positions of the first retaining portion 43 and the second retaining portion 63 match with each other so that the connection pin 70 (see FIG. 6) can be attached to and detached from the hole portion 43*a* of the first retaining portion 43 and the hole portion 63*a* of the second retaining portion 63. In this state, as illustrated in FIG. 6, the connection pin 70 is inserted into the first retaining portion 43 and the second retaining portion 63. At this time, an operator does not need to align the first retaining portion 43 and the second retaining portion 63 while lifting the rear strut 21 with the auxiliary crane. Therefore, the work of aligning the first retaining portion 43 and the second retaining portion 63 and the work of inserting the connection pin 70 can be easily performed.

In a state where the connection pin 70 is inserted into the first retaining portion 43 and the second retaining portion 63, an attachment pin (not illustrated) is attached to the pair of attachment pin holes 63*c* (see FIG. 5). Then, the connection pin 70 illustrated in FIG. 3 is fixed to the first bracket 40 and the second bracket 60. Similarly to the front side device 30 illustrated in FIG. 2, also in the rear side device 130, the first bracket 140 and the second bracket 160 are connected by the connection pin 170 (see FIG. 8). As a result, the rear strut 21 is connected (coupled) to and held by the front strut 22.

(Separation Between Rear Strut 21 and Front Strut 22)

The rear strut 21 and the front strut 22 are separated by a procedure reverse to or substantially reverse to the procedure of connecting the rear strut 21 and the front strut 22.

(Example of Connection and Disconnection Between Rear Strut 21 and Front Strut 22)

During transportation of the crane 1 (see FIG. 1), the rear strut 21 and the front strut 22 are transported in a state of being connected to each other (integrally). Next, the integrated rear strut 21 and front strut 22 are unloaded from a transport vehicle (such as a trailer) (not illustrated). At this time, the auxiliary crane lifts the integrated rear strut 21 and front strut 22. Since at this time, the rear strut 21 and the front strut 22 are connected to each other, when the auxiliary crane lifts the rear strut 21, the front strut 22 is also lifted. Next, the front strut 22 is attached to the distal end portion of the boom 13 (see FIG. 1). In a case where the front strut 22 is directly connected to the lower jib 15*a* as illustrated in FIG. 1 during transportation, as a result of attachment of the lower jib 15*a* to the boom 13, the front strut 22 may be attached to the boom 13 via the lower jib 15*a*. Next, the rear strut 21 illustrated in FIG. 2 is separated from the front strut 22. Next, the rear strut 21 is lifted by the auxiliary crane and attached to the distal end portion of the boom 13 (see FIG. 1). By a procedure reverse to this procedure, the rear strut 21 and the front strut 22 are removed from the boom 13 (see FIG. 1) and transported.

(Regarding State in which Rear Strut 21 is Solely Lifted)

FIG. 10 is a side view of a state in which the rear strut 21 illustrated in FIG. 2 is lifted as viewed from the lateral direction. As illustrated in FIG. 10, the first load receiving portion 45*a* and the first front-rear direction guide portion 45*b* are preferably disposed on a more inner side, in the longitudinal direction (front-rear direction) of the rear strut 21, than the first retaining portion 43, that is, at a portion close to the central portion of the rear strut 21 in the front-rear direction. The reason is as follows.

In a state where the rear strut 21 and the front strut 22 are separated from each other, the central portion of the rear strut 21 in the front-rear direction may be lifted by the auxiliary crane or the like. In this case, the rear strut 21 deflects convexly upward due to the self-weight of the rear strut 21. More specifically, the outer portions (a front portion and a rear portion) in the front-rear direction of the rear strut 21 deflect downward with respect to the central portion of the rear strut 21 in the front-rear direction. Then, the position (more specifically, a position in the front-rear direction and an angle with respect to the front-rear direction) of the first bracket 40 with respect to the central portion of the rear strut 21 in the front-rear direction changes. Hereinafter, this change will be simply referred to as "change in position of the first bracket 40" or the like (the same applies to the first front-rear direction guide portion 45b). Here, the amount of downward deflection (displacement amount) of the rear strut 21 increases as the distance from the central portion of the rear strut 21 in the front-rear direction to the outer side (front side, rear side) increases. Therefore, as the first bracket 40 is disposed on more inner side in the front-rear direction (the side closer to the central portion in the front-rear direction) of the rear strut 21, the change in the position of the first bracket 40 when the rear strut 21 is deflected can be reduced.

A portion (functional portion) of the first bracket 40 for use in a state where the rear strut 21 is lifted is the first front-rear direction guide portion 45b. Therefore, it is preferable that the first front-rear direction guide portions 45b (the recessed portion 45) is disposed on the inner side of the rear strut 21 in the front-rear direction as much as possible. As a result, it is possible to reduce a change in the position of the first front-rear direction guide portion 45b when the rear strut 21 is deflected as compared with a state where the rear strut 21 is not deflected. Accordingly, the load receiving member 65 easily enters the recessed portion 45 and easily comes into contact with the first front-rear direction guide portion 45b, so that the guide can be appropriately performed. In addition, since the load receiving member 65 easily enters the recessed portion 45, the first front-rear direction guide portion 45b (the recessed portion 45) can be reduced in size. More specifically, an interval in the front-rear direction between the inclined portions 45b1 illustrated in FIG. 4 can be narrowed. As a result, the first bracket 40 can be downsized.

When the rear strut 21 is lowered toward the front strut 22, the load of the rear strut 21 is received by the first load receiving portion 45a and the second load receiving portion 65a. Then, an upward convex deflection of the rear strut 21 illustrated in FIG. 10 disappears (see FIG. 2). In this state, the connection pin 70 (see FIG. 3) is inserted into the first retaining portion 43. Therefore, the first retaining portion 43 does not need to be disposed on the inner side of the rear strut 21 in the front-rear direction.

Accordingly, the first front-rear direction guide portion 45b is preferably disposed on a more inner side (specifically, the rear side) in the longitudinal direction of the rear strut 21 than the first retaining portion 43. In the second bracket 60 of the front side device 30, the second front-rear direction guide portion 65b is preferably disposed on a more inner side (specifically, a rear side) in the longitudinal direction of the front strut 22 than the second retaining portion 63. In the first bracket 140 of the rear side device 130, the first front-rear direction guide portion 145b is preferably disposed on a more forward side than the first retaining portion 143. In the second bracket 160 of the rear side device 130, the second front-rear direction guide portion 165b is preferably disposed on a more forward side than the second retaining portion 163.

(Dimension Control)

Consideration will be given to a case where the load receiving portion (see the first load receiving portion 45a illustrated in FIG. 4) and the retaining portion (see the first retaining portion 43 illustrated in FIG. 4) are provided in different brackets (hereinafter, referred to as an "individual bracket"). It is assumed that these individual brackets are fixed by welding (plate-working, canning) to both sides (left and right) in the lateral direction on both sides (front and rear) in the front-rear direction of the rear strut 21 illustrated in FIG. 2. In this case, the individual brackets are fixed to the rear strut 21 at a total of eight positions including four positions at the front and the rear and four positions at the left and the right. For this reason, it is difficult to align the individual brackets because of accumulation of tolerances (plate-working tolerances) of the attachment positions of the individual brackets. Specifically, the load receiving portion of the rear strut 21 is likely to be deviated in the front-rear direction with respect to the load receiving portion of the front strut 22 (see the second load receiving portion 65a illustrated in FIG. 4). In addition, the retaining portion of the rear strut 21 is likely to be deviated in the front-rear direction with respect to the retaining portion of the front strut 22 (see the second retaining portion 63 illustrated in FIG. 4). For this reason, the dimension control of the fixing position of the individual bracket to the rear strut 21 needs to be strict (tolerance accuracy requirement is strict), making the work of attaching the individual bracket difficult.

In addition, in a case where a deviation in the front-rear direction between the load receiving portion of the rear strut 21 and the load receiving portion of the front strut 22 is large, there might occur a need of separating a welded portion between the rear strut 21 (or the front strut 22) and the load receiving portion and performing welding again. In addition, even in a case where a deviation in the front-rear direction between the retaining portion of the rear strut 21 and the retaining portion of the front strut 22 is so large that the connection pin 70 cannot be attached or detached, there might occur a need of separating a welded portion between the rear strut 21 (or the front strut 22) and the retaining portion and performing welding again. Furthermore, in order to enable the connection pin 70 to be attached and detached even when the retaining portion of the rear strut 21 and the retaining portion of the front strut 22 largely deviate in the front-rear direction, it is conceivable to lengthen the long hole of the retaining portion (see the hole portion 43a illustrated in FIG. 4) in the front-rear direction. However, in this case, in a state where the rear strut 21 and the front strut 22 are connected to each other (e.g., during transportation), rattling of the rear strut 21 with respect to the front strut 22 may increase.

On the other hand, in the structure holding device 20 of the present embodiment, as illustrated in FIG. 4, the first load receiving portion 45a and the first retaining portion 43 are provided on the integrated (common) first bracket 40. Therefore, the number of brackets (the first bracket 40 and the like) can be halved as compared with a case where the load receiving portion and the retaining portion are provided in separate individual brackets. Specifically, for example, as illustrated in FIG. 2, the first bracket 40 is fixed to the front portion of the rear strut 21, and the first bracket 140 is fixed to the rear portion of the rear strut 21. In this case, the brackets are fixed to the rear strut 21 at a total of four positions including two positions at the front and the rear, and two positions at the left and the right. Therefore, accuracy required of a tolerance of the attachment position of the bracket is halved as compared with the case where the individual brackets are provided. This facilitates alignment of each bracket (such as the first bracket 40). Specifically, the position of the first load receiving portion 45a easily matches with the second load receiving portion 65a illustrated in FIG. 4. In addition, the position of the first retaining portion 43 easily matches with the second retaining portion 63. Therefore, the need of re-welding the bracket can be reduced. In addition, since the first retaining portion 43 is easily aligned with the second retaining portion 63, a length of the hole portion 43a in the front-rear direction can be shortened. Therefore, rattling of the rear strut 21 with respect to the front strut 22 can be suppressed in a state where the rear strut 21 and the front strut 22 are connected to each other (e.g., during transportation). In the structure holding device 20, only a part of the above operation may be obtained.

Effects obtained by the structure holding device 20 illustrated in FIG. 2 are as follows.

The structure unit 10 includes the structure holding device 20, the rear strut 21 (first structure), and the front strut 22 (second structure). The structure holding device 20 includes the first bracket 40, the second bracket 60, and the connection pin 70 (see FIG. 3). The rear strut 21 is disposed to extend in the front-rear direction. The front strut 22 is disposed to extend in the front-rear direction, and the rear strut 21 is overlaid on the front strut 22. The first bracket 40 is provided on the rear strut 21. The second bracket 60 is provided on the front strut 22. As illustrated in FIG. 3, the connection pin 70 is for connecting the first bracket 40 and the second bracket 60.

As illustrated in FIG. 4, the first bracket 40 includes the first retaining portion 43 and the first load receiving portion 45a. The hole portion 43a into which the connection pin 70 can be inserted is formed in the first retaining portion 43. The first load receiving portion 45a is provided integrally with the first retaining portion 43. The second bracket 60 includes the second retaining portion 63 and the second load receiving portion 65a. The hole portion 63a into which the connection pin 70 (see FIG. 3) can be inserted is formed in the second retaining portion 63. The second load receiving portion 65a is allowed to contact the first load receiving portion 45a and is provided integrally with the second retaining portion 63. As illustrated in FIG. 6, the first retaining portion 43 and the second retaining portion 63 are disposed such that the connection pin 70 is detachably attached to the first retaining portion 43 and the second retaining portion 63 in a state where the first load receiving portion 45a and the second load receiving portion 65a are in contact with each other.

The effects obtained by the above configuration are as follows. In a case where the load receiving portion and the retaining portion are provided as separate brackets (individual brackets) on the rear strut 21 illustrated in FIG. 2, it is necessary to control a dimension of the attachment position of the retaining portion to the rear strut 21 with respect to the attachment position of the load receiving portion to the rear strut 21. The same applies to the attachment position of the individual bracket to the front strut 22. On the other hand, in the above configuration, as illustrated in FIG. 4, the first load receiving portion 45a and the first retaining portion 43 are integrally provided on the first bracket 40, and the second load receiving portion 65a and the second retaining portion 63 are integrally provided on the second bracket 60. Therefore, it is unnecessary to control a dimension of the attachment position of the first retaining portion 43 to the rear strut 21 with respect to the attachment position of the first load receiving portion 45a to the rear strut 21. In addition, it is unnecessary to control a dimension of the attachment position of the second retaining portion 63 to the front strut 22 with respect to the attachment position of the second load receiving portion 65a to the front strut 22. Therefore, the following effects can be obtained as compared with the case where the load receiving portion and the retaining portion are provided as individual brackets. With the structure holding device 20, it is possible to cut down (eliminate or reduce) the number of places where dimension control regarding the attachment position of the bracket (the first bracket 40, the second bracket 60) to the structure (the rear strut 21, the front strut 22) is required. As a result, the structure unit 10 including the rear strut 21 and the front strut 22 can be easily manufactured.

Since in the above configuration, the first load receiving portion 45a and the first retaining portion 43 are provided in the common first bracket 40, the accuracy of the relative position between the first load receiving portion 45a and the first retaining portion 43 can be enhanced as compared with the case where the load receiving portion and the retaining portion are formed as individual brackets. Similarly, the accuracy of the relative position between the second load receiving portion 65a and the second retaining portion 63 can be enhanced. Therefore, when the first load receiving portion 45a and the second load receiving portion 65a come into contact with each other, the positions of the first retaining portion 43 and the second retaining portion 63 can be easily matched with each other. Therefore, the connection pin 70 (see FIG. 3) can be easily inserted into the first retaining portion 43 and the second retaining portion 63.

With the above configuration, the following effect may be obtained. In a case where the plurality of load receiving portions and the plurality of retaining portions are attached to the rear strut 21 as an individual bracket, as the number of individual brackets increases, the number of places where dimension control is required increases. The same applies to a case where an individual bracket is attached to the front strut 22. On the other hand, in a case where a plurality of the first brackets 40 having the above configuration are provided on the rear strut 21 and a plurality of the second brackets 60 having the above configuration are provided on the front strut 22, the dimensions of the plurality of first brackets 40 and the dimensions of the plurality of second brackets 60 only need to be controlled. Therefore, even in the case where the plurality of first brackets 40 and the plurality of second brackets 60 are provided, it is possible to reduce the number of places where dimension control is required as compared with the case where each load receiving portion and each retaining portion are provided as a plurality of individual brackets.

The first bracket 40 includes the first front-rear direction guide portion 45b. The second bracket 60 includes the second front-rear direction guide portion 65b. The first front-rear direction guide portion 45b and the second front-rear direction guide portion 65b guide the first load receiving portion 45a and the second load receiving portion 65a in a direction in which a deviation of the position of the second retaining portion 63 in the front-rear direction with respect to the first retaining portion 43 is reduced when the first load receiving portion 45a and the second load receiving portion 65a approach each other.

With the above configuration, when the first load receiving portion 45a and the second load receiving portion 65a are brought close to each other, the deviation of the position of the second retaining portion 63 with respect to the first retaining portion 43 in the front-rear direction is reduced. Therefore, the connection pin 70 (see FIG. 3) can be more reliably inserted into the first retaining portion 43 and the second retaining portion 63.

As illustrated in FIG. 10, the first front-rear direction guide portion 45b is disposed at a position closer to the central portion of the rear strut 21 in the front-rear direction than the first retaining portion 43.

With the above configuration, the following effect can be obtained. There is a case where the rear strut 21 is lifted and deflects convexly upward. At this time, the amount of downward deflection of the rear strut 21 with respect to the central portion in the front-rear direction is smaller at a portion closer to the central portion in the front-rear direction of the rear strut 21. Accordingly, in the above configuration, the first front-rear direction guide portion 45*b* is disposed at a position where the downward deflection of the rear strut 21 is as small as possible. Therefore, it is possible to suppress a change (displacement) in the position of the first front-rear direction guide portion 45*b* in a state where the rear strut 21 is deflected, the change being from a state where the rear strut 21 is not deflected. Therefore, even in a case where the rear strut 21 is lifted and deflects convexly upward, a guide function by the first front-rear direction guide portion 45*b* illustrated in FIG. 4 is reliably realized.

The structure holding device 20 includes the fastening member 50. The fastening member 50 fastens the first bracket 40 to the rear strut 21 so as to be positionally adjustable in the front-rear direction.

The above configuration enables the position of the first bracket 40 in the front-rear direction to be easily adjusted with respect to the rear strut 21. As a result, the relative position between the first retaining portion 43 and the second retaining portion 63 can be easily adjusted. Therefore, the connection pin 70 (see FIG. 3) can be reliably inserted into the first retaining portion 43 and the second retaining portion 63. Further, even when the first retaining portion 43 and the second retaining portion 63 are deviated to such an extent that the connection pin 70 cannot be inserted into the first retaining portion 43 and the second retaining portion 63, the relative position between the first retaining portion 43 and the second retaining portion 63 can be easily adjusted so that the connection pin 70 can be inserted.

The fastening member 50 may fasten the second bracket 60 to the front strut 22 so as to be positionally adjustable in the front-rear direction. Also in this case, an effect similar to the effect obtained by the above configuration can be obtained.

As illustrated in FIG. 6, the hole portion 43*a* of the first retaining portion 43 is a long hole having a shape extending long in the front-rear direction.

The above configuration enables the connection pin 70 to be easily inserted into the first retaining portion 43 and the second retaining portion 63 even when the center of the hole portion 43*a* of the first retaining portion 43 (the center of the drawing as viewed from the lateral direction) is deviated from the center of the hole portion 63*a* of the second retaining portion 63.

Here, in the above configuration, the connection pin 70 can be easily inserted into the first retaining portion 43 and the second retaining portion 63 as compared with the case where individual brackets are provided. Therefore, as compared with the case where the individual brackets are provided, even if the length of the hole portion 43*a* in the front-rear direction is shortened, the connection pin 70 can be easily inserted into the first retaining portion 43 and the second retaining portion 63. Therefore, in a case where the length of the hole portion 43*a* in the front-rear direction is shortened, rattling between the first bracket 40 and the second bracket 60 in a state where the first bracket 40 and the second bracket 60 are connected by the connection pin 70 can be suppressed. As a result, rattling of the rear strut 21 with respect to the front strut 22 in a state where the front strut 22 and the rear strut 21 are connected can be suppressed.

The hole portion 63*a* of the second retaining portion 63 may be a long hole extending long in the front-rear direction. Also in this case, an effect similar to the effect obtained by the above configuration can be obtained.

One of the "first structure" and the "second structure" is the front strut 22 of the crane 1 illustrated in FIG. 1. Another of the "first structure" and the "second structure" which is different from the front strut 22 is the rear strut 21 of the crane 1. In other words, the rear strut 21 may constitute the second structure of the present invention, and the front strut 22 may constitute the first structure of the present invention.

With the above configuration, when the rear strut 21 and the front strut 22 are manufactured, it is possible to reduce the number of places where dimension control regarding the attachment position of the bracket (the first bracket 40, the second bracket 60) is required.

(Modification) The above embodiment may be variously modified. For example, the arrangement and the shape of each component of the above embodiment may be changed. For example, the number of the components may be changed, and a part of the components may not be provided. For example, the components may be fixed or coupled directly or indirectly. For example, those described as a plurality of members or portions different from each other may be one member or portion. For example, those described as one member or portion may be provided separately as a plurality of different members or portions.

The structure provided with the structure holding device 20 illustrated in FIG. 2 may be a raising-lowering member of the crane 1 other than the rear strut 21 and the front strut 22 illustrated in FIG. 1. The structure provided with the structure holding device 20 may be at least a part of the boom 13, at least a part of the jib 15, the mast 14*a*, or a gantry (not shown). Specifically, for example, the structure provided with the structure holding device 20 may be a plurality of the intermediate booms 13*b* or a plurality of the intermediate jibs 15*b*. For example, when the boom 13 (or the jib 15) is stored in a disassembled state, a plurality of the intermediate booms 13*b* (or the intermediate jibs 15*b*) may be in a state of being vertically overlaid. In this case, the structure holding device 20 can be used. Furthermore, the structure provided with the structure holding device 20 may be a structure other than the raising-lowering member of the crane 1, a structure of a working machine other than the crane 1, or a structure other than the working machine.

According to the present invention, there is provided a structure unit including: a first structure having a shape elongated in a first direction; a second structure having a shape elongated in a second direction; and a structure coupling portion capable of detachably coupling the first structure and the second structure to each other in a coupling allowable state in which the first direction and the second direction extend in horizontal reference directions, respectively, and the first structure is disposed on the second structure. The structure coupling portion includes: a first coupling portion attached to the first structure; a second coupling portion attached to the second structure; and a coupling pin that couples the first coupling portion and the second coupling portion to each other. The first coupling portion includes: a first pin receiving portion provided with a first hole portion capable of receiving the coupling pin along an insertion direction that is a direction intersecting the reference direction; and a load transmitting portion configured to be attachable to the first structure integrally with the first pin receiving portion and to transmit a self-weight of the first structure to the second coupling portion. The second coupling portion includes: a second pin receiving portion provided with a second hole portion capable of receiving the coupling pin inserted into the first hole portion in the coupling allowable state along the insertion direction; a load receiving portion configured to be attachable to the second structure integrally with the second pin receiving portion and to support the load transmitting portion so as to receive the self-weight of the first structure; and a restraining portion that restrains the first coupling portion in the reference direction such that the first hole portion and the second hole portion match with each other in the insertion direction in a state where the load receiving portion supports the load transmitting portion.

According to this configuration, in the coupling allowable state in which the first structure is disposed on the second structure, the structure coupling portion can detachably couple the first structure and the second structure to each other. In addition, since the load transmitting portion is configured to be attachable to the first structure integrally with the first pin receiving portion and the load receiving portion is configured to be attachable to the second structure integrally with the second pin receiving portion, it is possible to reduce the number of portions requiring dimension control as compared with a case where the first pin receiving portion and the load transmitting portion are independently attached to the first structure and the second pin receiving portion and the load receiving portion are independently attached to the second structure.

In the above configuration, preferably, the first coupling portion further includes a restrained portion that is restrained in the reference direction by the restraining portion, and at least one of the first coupling portion and the second coupling portion further includes a guide portion that guides the load transmitting portion downward toward the load receiving portion and along the reference direction.

According to this configuration, when the first structure is brought close to the second structure, the load transmitting portion can be reliably guided toward the load receiving portion.

In the above configuration, it is preferable that the load transmitting portion and the restrained portion are disposed at a portion closer to a central portion of the first structure in the reference direction than the first pin receiving portion.

According to this configuration, even in a case where deflection occurs in the long first structure when the first structure is lifted, the load transmitting portion and the restrained portion can be reliably guided toward the load receiving portion and the restraining portion.

In the above configuration, it is preferable to further include a fastening member that fastens the first coupling portion to the first structure so as to be positionally adjustable in the reference direction, or fastens the second coupling portion to the second structure so as to be positionally adjustable in the reference direction.

According to this configuration, since the position of the first coupling portion or the second coupling portion can be adjusted in the reference direction, the first hole portion and the second hole portion can be more easily aligned when the first structure and the second structure are coupled.

In the above configuration, at least one of the first hole portion of the first pin receiving portion and the second hole portion of the second pin receiving portion is preferably a long hole formed to extend long in the reference direction.

According to this configuration, even in a case where the center of the first hole portion is deviated from the center of the second hole portion in a state where the load transmitting portion is supported by the load receiving portion, the coupling pin can be easily attached to and detached from the first hole portion and the second hole portion.

In the above configuration, it is preferable that one of the first structure and the second structure is a front strut of a crane, and another of the first structure and the second structure is a rear strut of the crane.

According to this configuration, in the coupling allowable state in which on one structure of the front strut and the rear strut, the other structure is disposed, the structure coupling portion can detachably couple the front strut and the rear strut to each other. In addition, since the load transmitting portion is configured to be attachable to the one structure integrally with the first pin receiving portion, and the load receiving portion is configured to be attachable to the other structure integrally with the second pin receiving portion, it is possible to reduce the number of portions requiring dimension control as compared with a case where the first pin receiving portion and the load transmitting portion are independently attached to the one structure, and the second pin receiving portion and the load receiving portion are independently attached to the other structure.

The invention claimed is:

1. A structure unit comprising:
   a first structure having a shape elongated in a first direction and opposite free ends in the first direction;
   a second structure having a shape elongated in a second direction; and
   a structure coupling portion capable of detachably coupling the first structure and the second structure to each other in a coupling allowable state in which the first direction and the second direction extend in horizontal reference directions, respectively, and the first structure is disposed on the second structure,
   wherein the structure coupling portion includes:
   a first coupling portion attached to the first structure;
   a second coupling portion attached to the second structure; and
   a coupling pin that couples the first coupling portion and the second coupling portion to each other,
   the first coupling portion is attached to a portion at one side with respect to a central portion of the first structure in the reference direction,
   the second coupling portion is attached to a portion at one side with respect to a central portion of the second structure in the reference direction,
   the first coupling portion includes:
   a first pin receiving portion provided with a first hole portion capable of receiving the coupling pin along an insertion direction that is a direction intersecting the reference direction; and
   a load transmitting portion configured to be attachable to the first structure integrally with the first pin receiving portion and to transmit a self-weight of the first structure to the second coupling portion,
   the second coupling portion includes:
   a second pin receiving portion provided with a second hole portion capable of receiving the coupling pin inserted into the first hole portion in the coupling allowable state along the insertion direction;
   a load receiving portion configured to be attachable to the second structure integrally with the second pin receiving portion and to support the load transmitting portion so as to receive the self-weight of the first structure; and
   a restraining portion that restrains the first coupling portion in the reference direction such that the first hole portion and the second hole portion match with each other in the insertion direction in a state where the load receiving portion supports the load transmitting portion, the first coupling portion further includes a restrained portion that is restrained in the reference direction by the restraining portion, at least one of the first coupling portion and the second coupling portion further includes a guide portion that guides the load transmitting portion downward toward the load receiving portion and along the reference direction, and the guide portion is disposed at a portion closer to a central portion of the first structure in the reference direction than the first pin receiving portion.

2. The structure unit according to claim 1, further comprising a fastening member that fastens the first coupling portion to the first structure so as to be positionally adjustable in the reference direction, or fastens the second coupling portion to the second structure so as to be positionally adjustable in the reference direction.

3. The structure unit according to claim 1, wherein at least one of the first hole portion of the first pin receiving portion and the second hole portion of the second pin receiving portion is a long hole formed to extend long in the reference direction.

4. The structure unit according to claim 1, wherein
one of the first structure and the second structure is a front strut of a crane, and
another of the first structure and the second structure is a rear strut of the crane.

* * * * *